United States Patent
Groff et al.

(10) Patent No.: US 12,333,493 B2
(45) Date of Patent: Jun. 17, 2025

(54) SYSTEMS AND METHODS FOR MANAGING BEVERAGE DISPATCHING

(71) Applicant: WE SCAN, LLC, Grapevine, TX (US)

(72) Inventors: Greg Groff, Keller, TX (US); Jesse Crabbe, Irving, TX (US); Brett Stallard, Dallas, TX (US)

(73) Assignee: WE SCAN, LLC, Grapevine, TX (US)

(*) Notice: Subject to any disclaimer, the term of this patent is extended or adjusted under 35 U.S.C. 154(b) by 0 days.

(21) Appl. No.: 17/503,971

(22) Filed: Oct. 18, 2021

(65) Prior Publication Data

US 2023/0124838 A1   Apr. 20, 2023

(51) Int. Cl.
| | |
|---|---|
| G06Q 10/08 | (2024.01) |
| G06Q 10/0875 | (2023.01) |
| G06Q 20/20 | (2012.01) |
| G06Q 20/32 | (2012.01) |
| G06V 10/10 | (2022.01) |
| G06V 10/70 | (2022.01) |

(52) U.S. Cl.
CPC ......... G06Q 10/0875 (2013.01); G06Q 20/20 (2013.01); G06Q 20/3276 (2013.01); G06V 10/10 (2022.01); G06V 10/70 (2022.01)

(58) Field of Classification Search
CPC ........ G06Q 10/06; G06Q 30/02; G06Q 20/20; G06Q 10/08; G06Q 10/0875; G06Q 50/12
See application file for complete search history.

(56) References Cited

U.S. PATENT DOCUMENTS

| | | | | |
|---|---|---|---|---|
| 8,151,832 | B1* | 4/2012 | Dorney | G07F 9/001 141/94 |
| 8,306,845 | B2* | 11/2012 | D'Imporzano | G06Q 10/06393 705/7.29 |
| 8,719,075 | B2* | 5/2014 | MacDonald Korth | G06Q 30/0601 705/7.35 |
| 9,679,329 | B2* | 6/2017 | Jones | G07F 13/065 |
| 10,467,559 | B1* | 11/2019 | Svenson | G06Q 20/326 |
| 10,546,344 | B2* | 1/2020 | Bell | G06F 3/04817 |
| 10,664,722 | B1* | 5/2020 | Sharma | G06F 18/22 |
| 10,796,162 | B2* | 10/2020 | Yamazaki | G06T 7/73 |
| 10,943,311 | B1* | 3/2021 | Svenson | G06Q 30/0601 |
| 10,956,975 | B1* | 3/2021 | Abdul Gaffar | G06F 3/011 |
| 10,984,374 | B2* | 4/2021 | Pike | G06K 7/10722 |

(Continued)

*Primary Examiner* — Florian M Zeender
*Assistant Examiner* — Milena Racic
(74) *Attorney, Agent, or Firm* — Polsinelli PC

(57) ABSTRACT

Systems and methods include onboarding services for retailer devices, guest user services for a user device, and operational services provided to the retailer devices and the guest user services for dispatching beverage orders. The onboarding services map retailer inventory of a retail establishment to a standardized product schema. Upon detecting that the user device is within a predetermined distance of the retailer device, the system generates and presents a user preference by performing a rationalized perato analysis on an order history associated with the user device. The order history and the preference are mapped to the standardized product schema. The user device receives a beverage order selection and, in response, the system generates a randomized order image to be presented at the user device and the retailer device. A transaction corresponding to the beverage order selection is executed at a point-of-sale (POS) system.

20 Claims, 24 Drawing Sheets

(56) References Cited

U.S. PATENT DOCUMENTS

| | | | |
|---|---|---|---|
| 11,053,113 B2* | 7/2021 | Tomforde | G07F 13/065 |
| 11,124,405 B2* | 9/2021 | Kline | G07F 9/009 |
| 11,208,315 B2* | 12/2021 | Crawford | G07F 13/065 |
| 11,455,869 B2* | 9/2022 | Bronicki | G06V 10/764 |
| 11,661,327 B2* | 5/2023 | Bergmann | B67D 1/0801 222/23 |
| 2002/0038165 A1* | 3/2002 | McHale, IV | G06Q 30/02 700/216 |
| 2007/0228068 A1* | 10/2007 | Schneider | G06Q 10/087 222/1 |
| 2012/0323656 A1* | 12/2012 | Leach | G06Q 30/0239 705/14.1 |
| 2018/0137551 A1* | 5/2018 | Zheng | G06F 16/583 |
| 2019/0005569 A1* | 1/2019 | Kotha | G06F 16/29 |
| 2020/0356910 A1* | 11/2020 | Nguyen | G06K 19/0716 |
| 2020/0364810 A1* | 11/2020 | Carter | H04N 1/00411 |
| 2021/0097515 A1* | 4/2021 | Jenkins | G06K 7/1417 |
| 2021/0256540 A1* | 8/2021 | Nakanishi | G06Q 30/0201 |
| 2022/0114868 A1* | 4/2022 | Bronicki | G06V 40/172 |
| 2022/0374855 A1* | 11/2022 | Balaoro | G06Q 20/401 |

* cited by examiner

SYSTEMS AND METHODS FOR MANAGING BEVERAGE DISPATCHING

FIELD

Aspects of the presently disclosed technology relate generally to food ordering dispatching systems and more particularly to dispatching beverage orders for multiple establishments having various inventories.

BACKGROUND

Many retail establishments offer a variety of alcoholic beverages for sale to customers. To order an alcoholic beverage, a customer typically arrives at an establishment, reviews a menu of options, attracts the attention of a server or bartender, places an order with the server or bartender, and waits for the order to arrive. The amount of time to complete this process and receive a beverage can vary significantly depending on the size of the establishment, the number of drink options, the decisiveness of the customer, the number of working employees, and the number of other customers at the establishment also ordering drinks (e.g., the queue). The drink ordering process is made more complicated when multiple customers order some drinks together on a single bill while also ordering some drinks separately (e.g., when one customer buys a round for friends).

Customers often wait many minutes before ordering and receiving their beverages, especially at popular venues during peak business times, which can sometimes have a half hour queue or more for receiving a drink. Spending time surveying the menu and waiting in line at a bar to place a drink order pulls the customer away from the social scene at the bar, which can be frustrating for customers who go to the bar to socialize—not to stand in line.

Moreover, customers often have particular preferences for their favorite alcoholic beverages. Every establishment is different and determining whether an establishment has the particular preference available, or is willing to make a customized beverage to match the particular preference, further adds to the delays that can arise during the beverage ordering process. A server may not have complete knowledge of what is available and, therefore, must consult with additional personnel to determine if special requests can be fulfilled.

Additionally, popular establishments often reach full capacity as determined by fire safety regulations and, therefore, create lines outside for potential customers waiting to enter. Some people come to these establishments intending only to socialize with friends without purchasing any beverages. When these people occupy a popular establishment at full capacity, the establishment losses revenue by having less paying customers and forcing potentially paying customers to wait in line.

It is with these observations in mind, among others, that various aspects of the present disclosure were conceived and developed.

SUMMARY

Implementations described and claimed herein address the foregoing problems by providing systems and methods for dispatching beverage orders. In some examples, a method for beverage order dispatching comprises storing a standardized product schema representing a plurality of beverage products; receiving an onboarding input indicating inventory data associated with a retailer device; mapping the inventory data to a plurality of product identifiers from the standardized product schema; determine that a user device associated with a user profile is at a location associated with the retailer device; determining a preference associated with the user profile, the preference corresponding to a product identifier of the plurality of product identifiers from the standardized product schema; causing, based on the preference corresponding to the product identifier, an indicator associated with the preference to be presented at the user device; receiving an order input indicating a selection of the preference; generating an order image corresponding to the selection; causing the order image to be displayed at the retailer device; causing the order image to be displayed at the user device; and/or receiving a transaction confirmation associated with the order image.

In some instances, the order input is a first order input, the product identifier is a first product identifier, and the method further comprises: receiving a second order input corresponding to a second product identifier; determining that the second product identifier is absent from the plurality of product identifiers corresponding to the inventory data; and generating, in response to the second product identifier being absent from the plurality of product identifiers corresponding to the inventory data, a prompt at the retailer device to add the second product identifier to the plurality of product identifiers corresponding to the inventory data. Moreover, the method can further include causing a beverage ordering service application to be operational at the retailer device for receiving the order image; wherein generating the prompt to add the second product identifier to the plurality of product identifiers corresponding to the inventory data occurs after the beverage ordering service application is operational at the retailer device. The method can additionally include mapping a transaction associated with the transaction confirmation to a point-of-sale (POS) device associated with the retailer device.

In some examples, the order input is a first order input and the product identifier is a first product identifier, and the method further comprises: receiving a second order input at a point-of-sale (POS) system associated with the retailer device; determining that the second order input corresponds to a second product identifier that is absent from the plurality of product identifiers corresponding to the inventory data; and adding the second product identifier to the plurality of product identifiers corresponding to the inventory data. Furthermore, the inventory data can include one or more indications of: an alcohol category, an alcohol type, an alcohol brand, a custom beverage recipe, a standardized beverage recipe, a recipe modifier, a pour volume, a beverage packaging, a type of glassware, a house beverage indicator, a well beverage indicator, a rotator beverage indicator, a point-of-sale (POS) system category identifier, or a discount time period. The method can further comprise generating the inventory data by: performing image recognition or text recognition on an image file of a beverage product, the image file generated by the retailer device; or scanning a bar code of the beverage product. Generating the order image can include performing a randomized image generation procedure that selects a color and an object image to form the order image. Moreover, the method can further comprise: causing the order image to be displayed at the retailer device with a first photo corresponding to the user profile; and causing the order image to be displayed at the user device with a second photo corresponding to a retailer personnel.

In some instances, determining the preference includes performing a rationalized pareto analysis on an order history associated with the user profile. For examples, the rationalized pareto analysis can generate simulated competitions between beverage recipe types, recipe modifiers, and sales tax designations indicating a beverage origin to determine the preference. The method can further comprise: calculating a size dimension of the indicator based on a result of the rationalized pareto analysis. Additionally, the user device can be a first user device, the user profile a first user profile, and the method can further comprise: determining that a second user device associated with a second user profile is at the location associated with the retailer device; determining that the second user profile is associated with the first user profile via a friend status; and receiving, from the first user device, a beverage order associated with the second user profile, wherein the order image corresponds to the beverage order and the selection of the preference. The method can further comprise sending, to the user device, a request for an informal order commitment; receiving a confirmation of the request; and causing an establishment entry pass to be presented at the user device at least partly in response to the confirmation.

In some examples, a method for beverage order dispatching comprises: storing a standardized product schema representing a plurality of beverage products; receiving an onboarding input associated with a retailer device indicating inventory data; mapping the inventory data to a plurality of product identifiers from the standardized product schema; causing one or more indicators corresponding to one or more beverage items to be presented at a user device, the one or more beverage items being associated with a subset of the plurality of product identifiers from the standardized product schema; receiving an item selection input indicating a selected beverage item from the one or more beverage items; causing an order indicator to be displayed at the retailer device; receiving a transaction confirmation associated with a transaction represented by the order indicator; and/or mapping the transaction to a point-of sales (POS) system associated with the retailer device.

In some instances, the method further comprises associating the transaction with an order preparation category, the order preparation category being a pending orders category, a working orders category, or a ready orders category. The method can further comprise determining a maximum working orders threshold value, wherein associating the transaction with the order preparation category is based on the maximum working orders threshold value. The method can additionally comprise determining an amount of visits or an amount of verifications associated with the user device, wherein associating the transaction with the order preparation category is based on the amount of visits or the amount of verifications associated with the user device. In some instances, the method comprises determining a glassware volume associated with the transaction; determining an alcohol percentage associated with the transaction; calculating an amount of standard drink unit (SDU)s based on the glassware volume and the alcohol percentage; and/or storing an indication of the amount of SDUs accessible by the user device or the retailer device.

In some examples, a method for beverage order dispatching comprises: determining that a user device associated with a user profile is within a predetermined distance of a retailer device; performing a rationalized pareto analysis on an order history of the user profile to determine a beverage preference associated with the user profile; causing an indicator associated with the beverage preference to be presented at the user device, a size dimension of the indicator being based on a result of the rationalized pareto analysis; receiving an order input indicating a selection of the beverage preference; generating an order image corresponding to the selection; causing the order image to be displayed at the retailer device; causing the order image to be displayed at the user device; and/or receiving a transaction confirmation associated with the order image.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Figure 1:
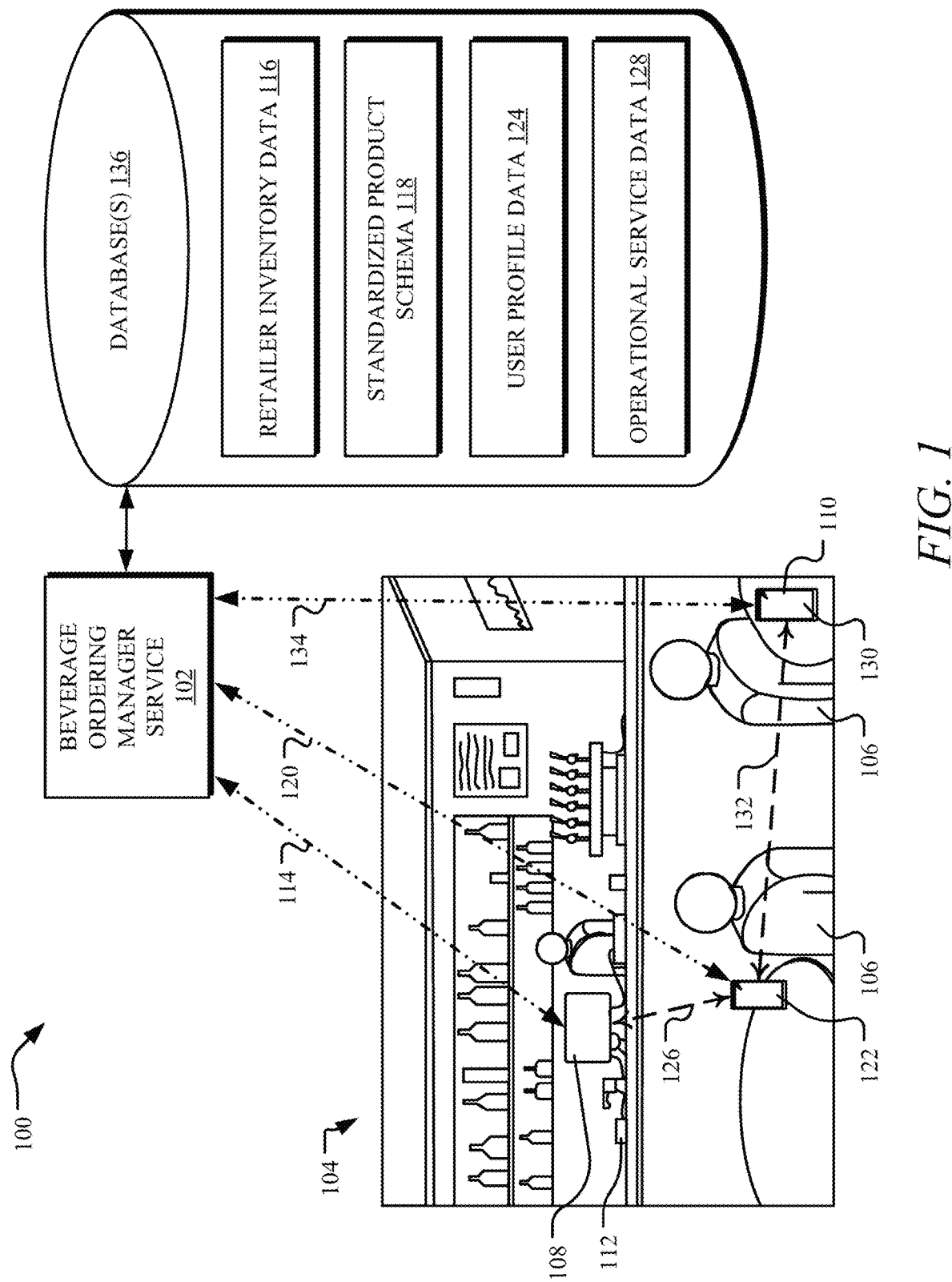
FIG. 1 illustrates an example system for dispatching beverage ordering.

Aspects of the present disclosure involve systems and methods including a beverage ordering manager service to manage beverage orders for a retail establishment and guests at the retail establishment using their respective devices. The beverage ordering manager service facilitates communication and interactions among a retailer device, user devices, and a point-of-sale (POS) system connected to the retailer device. As such, the beverage ordering manager service provides multiple services to facilitate any or every step of the beverage ordering process. The systems discussed herein improve the beverage ordering process with these services and ultimately perform multiple steps performed by server staff, while providing additional services that cannot be performed by server staff, in a more efficient, consistent, accurate, and scalable manner. For instance, the beverage ordering manager service tracks the retailer inventory data, detects which retail establishment the user device visits, receives beverage orders, manages an order fulfillment process, and executes transactions. Preference predictions based on an order history of the user are generated and presented at the user device (e.g., which can be tailored to the inventory data of the retail establishment). To further improve the beverage exchange process, the system generates a randomized order image representing the transaction and presents the order image at both the retailer device and the user device. Additionally, by syncing with the POS system, the beverage ordering manager service automatically executes the transaction for the retail establishment and the guest.

Many of the services disclosed are provided by generating and using a standardized product schema. The standardized product schema is a vast index of many different type of alcoholic beverage (e.g., nearly every commonly-stocked beverage) organized hierarchically into categories and sub-categories for each item. The standardized product schema spans many brands, beverage types, styles, and packaging varieties. It also includes recipes made from different beverage items and modifiers to the recipes and beverage items. The system maps the inventory data from the various retail establishments to product identifiers of the standardized product schema, normalizing the inventory data from the different retail establishments. Moreover, order histories associated with user profiles and preferences generated from the order histories can also be mapped to the standardized product schema. Accordingly, the beverage ordering manger service can use the product identifiers from the standardized product schema to facilitate the beverage order transactions resulting in a consistent experience across multiple different retail establishments. Moreover, the quick and intuitive onboarding process for the retail establishment results in rapid deployment of the beverage ordering manger service in contrast to more cumbersome techniques.

The beverage ordering manager service can manage the entire beverage ordering process—from initial inventory tracking for the retail establishment to executing the transaction at the POS system. Techniques disclosed herein for collecting different inputs, analyzing the inputs, and outputting instructions to the different devices at the various beverage ordering steps provides multiple efficiencies and improved services to the retail establishment and the guest beyond what typical server staff can provide. For instance, the preference generating and beverage ordering techniques can simplify and improve the ordering process for the user while using minimal computational resources.

Additional advantages of the disclosed technology will become apparent from the detailed description below.

Figure 2:
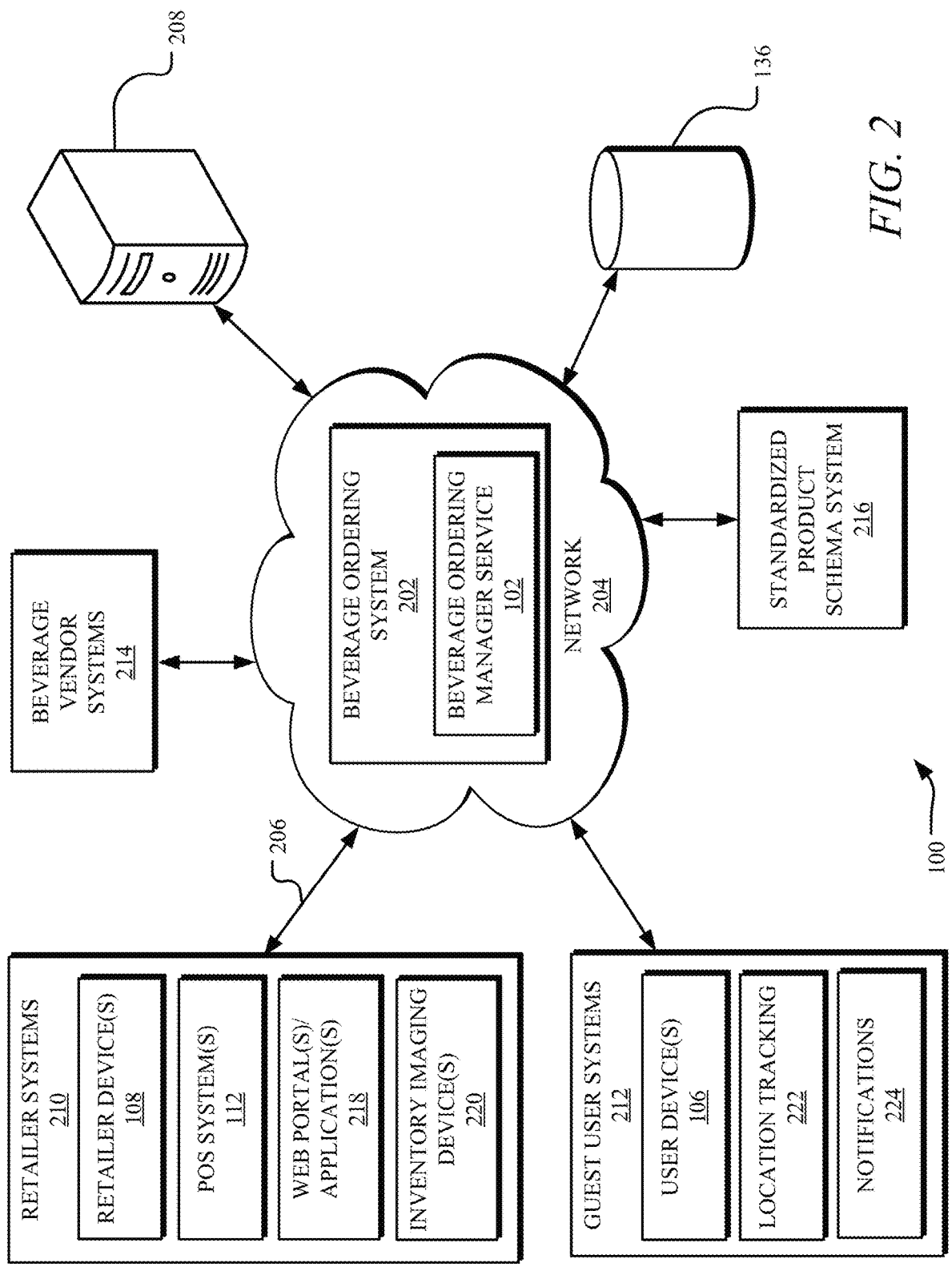
FIG. 2 illustrates an example network environment for dispatching beverage ordering.

FIGS. 1 and 2 illustrate an example system 100 including a beverage ordering manager service 102 of a beverage ordering system 202 for managing beverage orders for a retail establishment 104 and one or more user(s) 106 (e.g., "guests" or "customers"). The beverage ordering manager service 102 facilitates communication and interactions among a retailer device 108 associated with the retail establishment 104, one or more user device(s) 110, and a point-of-sale (POS) system 112 associated with the retailer device 108. As such, the beverage ordering manager service 102 can facilitate multiple, different steps of a beverage ordering process for both the retail establishment 104 and the user(s) 106. The beverage ordering manager service 102 provides a quick onboarding service for the retail establishment 104 for rapid deployment, a preference creating service for the user 106 to simplify the beverage selection process, and a POS mapping service to automate the transaction process. These services and various other services, and the benefits resulting therefrom, are discussed in greater detail below. The description of FIG. 1 highlights some of these services.

For instance, the beverage ordering manager service 102 can provide an onboarding service for the retail establishment 104 resulting in rapid deployment. The beverage ordering manager service 102 can connect to the retailer device 108 and receive onboarding input data from the retailer device 108 with a first network connection 114 (e.g., a TCP/IP connection). The beverage ordering manager service 102 can receive retailer inventory data 116 from the retailer device 108 and can map the retailer inventory data 116 to a standardized product schema 118 (e.g., to correlate the retailer inventory data 116 with a plurality of product identifiers from the standardized product schema 118). The retailer inventory data 116 can include one or more indications associated with the retail establishment 104 of an alcohol category, an alcohol type, an alcohol brand, a custom beverage recipe, a standardized beverage recipe, a recipe modifier, a pour volume, a beverage packaging, a type of glassware, a house beverage indicator, a well beverage indicator, a rotator beverage indicator, a POS system category identifier, and/or a discount time period. In some instances, the onboarding service includes an initial intake process facilitated by a streamlined, multi-step, intuitive navigator (e.g., an onboarding wizard), which provides multiple prompts and selectable options to speed up the onboarding process. For instance, the initial intake process can capture a majority of the retailer inventory data 116 (e.g., 90%), so that the retailer device 108 can quickly deploy and initiate an operational service mode (e.g., ready to receive beverage orders), even if all of the retailer inventory data 116 is not fully captured. Remaining retailer inventory data 116 can be provided to the beverage ordering manager service 102 via continuous updates while the retailer device 108 is operational to receive drink orders. For example, a beverage order received at the retailer device 108 may correspond to a beverage item that has not yet been mapped to the standardized product schema 118 and, in response, the beverage ordering manager service 102 can cause a prompt to be presented at the retailer device 108 to add the unmapped beverage item to the mapping of the standardized product schema. 118. As such, the system 100 can reduce an amount of time to gather the retailer inventory data 116 so that the retail establishment can rapidly deploy the beverage ordering manager service.

The beverage ordering manager service 102 provides benefits to the user(s) 106 in addition to the retail establishment 104. A second network connection 120 (e.g., a cellular or wireless data connection) can connect a first user device 122 to the beverage ordering manager service 102 so that the beverage ordering manager service 102 can receive and send data to and from the first user device 122. The system 100 can provide user profile creation services for the first user device 122 to generate a user profile (e.g., user profile data 124) and can analyze an order history associated with the user profile data 124 to generate a predictive preference for the first user device 122 (e.g., using a rationalized pareto analysis). In some instances, the beverage ordering manager service 102 detects when the first user device 122 is within a predetermined distance 126 of the retailer device 108 (e.g., based on comparing Global Positioning System (GPS) data received from the first user device 122 to geofencing data associated with the retailer device 108). In response to determining that the user 106 is at the retail establishment 104 (e.g., based on the first user device 122 being within the predetermined distance 126 of the retailer device 108), the beverage ordering manager service 102 can cause indicators or icons representing beverage items to be presented on the first user device 122. For instance, an indicator can correspond to the preference calculated from the order history. The preference and/or order history of the user device 122 can also be mapped to the standardized product schema 118. Therefore, the beverage ordering manager service 102 can cross-reference the preference with available beverage items at the retail establishment 104 (e.g., that have been mapped to the standardized product schema 118) to determine whether to present the preference as a selectable beverage item indicator. Accordingly, the beverage ordering manager service 102 can improve the beverage ordering process for the user 106 by reducing an amount of time perusing a drink menu or making a decision for the beverage selection. Moreover, because the preference is mapped to the same standardized product schema 118 as the retailer inventory data 116, the preference generating service can be used consistently at multiple different establishments while still being cross-referenced and customized to match the retailer inventory data 116 for the different retail establishments 104.

In some examples, the beverage ordering manager service 102 receives, generates, stores, and/or sends operational service data 128 to facilitate transactions and transaction-related activity between the user device(s) 110, the retailer device 108, and/or the POS system 112. For instance, the beverage ordering manager service 102 can receive, from the first user device 122, a selection of a beverage item indicator (e.g., indicating the preference or another beverage item) for a transaction. In response, the beverage ordering manager service 102 generates an order indicator (e.g., an order image) representing the transaction. The system 100 can perform a randomized order image generation process to generate the order image such that it is a unique order image particularized for the transaction. The beverage ordering manager service 102 can cause the order image to be presented at both the first user device 122 and the retailer device 108. When the user 106 visits a delivery area (e.g., a bar counter delivery area) and/or a server delivers the beverage item to the user 106, the user 106 and the server/bartender can visually verify their respective identifies by matching the order image displayed on the retailer device 108 and the user device 110 (obviating the need for additional table identifiers). Moreover, a first photo associated with the server (or bartender or other retailer personnel) can be displayed at the first user device 122 and a second photo associated with the user profile data 124 can be displayed at the retailer device 108, further simplifying and improving the delivery portion of the beverage ordering process. Additional examples of operational service data 128 collected, generated, stored, and/or sent by the beverage ordering manager service 102 to facility transactions for the user device(s) 110 within the predetermined distance 126 of the retailer device 108 (e.g., or prior to arriving within proximity of the retailer device 108) are discussed below.

In some examples, the beverage ordering manager service 102 provides a friend ordering service for the user device 122. The friend ordering service uses friend associations between multiple user profiles (e.g., a first user profile of the first user device 122 and a second user profile of a second user device 130). The system 100 can determine that the second user device 130 is within a predetermined distance 132 of the first user device 122 and/or within the predetermined distance 126 of the retailer device 108. For instance, the beverage ordering manager service 102 can receive GPS data from the second user device 130 through a second network connection 134 (e.g., and drink orders, user profile creation data, and/or other input data). The friend association between the first user device 122 and the second user device 130 can be established at the retail establishment 104 (e.g., based on a search performed at one of the user devices, GPS coordinate matching, or by near field communication detection) or prior to the first user device 122 and the second user device 130 arriving at the retail establishment 104. The friend service can order a beverage item for the second user profile and/or the second user device 130 from the first user device 122, offer to buy a round of beverage items for multiple user profiles and/or user devices 110 from the first user device 122, and provide other services. As such, the friend services improve the beverage ordering process by reducing an amount of time for ordering beverages for friends, merging bills, separating bills, and managing multiple combinations of bills by reducing visits to the bar and/or interactions with bar personnel (which can consume significant time during peak busy hours).

In some instances, the beverage ordering manager service 102 provides an entry pass or digital pass service for the retailer device 108 and the user device(s) 106. The entry pass or digital pass services can increase revenue for the retail establishment 104 by increasing a percentage of customers or guests that come into the establishment 104 and spend money. For instance, upon the first user device 110 being within the predetermined distance 126 of the retailer device 108, or in response to an indication that the first user device 110 will or intends to enter the retail establishment 104, the beverage ordering manager service 102 can cause a prompt requesting an entry commitment to be presented at the user device 110. The entry commitment can be an informal indication of a willingness to fulfil a particular entry metric. For instance, the prompt can ask the user 106 to commit to an entry fee or to spend a predetermined amount at the retail establishment 104, for instance, on food, games, beverages, and the like (e.g., $20, $30, $40, etc.). The entry commitment can request the user 106 spend a predetermined amount of time at the establishment 104. Moreover, the entry commitment can request the user commit to bringing at least a predetermined amount of other people (e.g., friends) with the user 106 to the establishment (e.g., at least two friends, three friends, four friends, five friends, six friends, etc.). The user device 110 can receive a user input confirming that the user 106 commits to fulfilling the entry metric for the entry commitment. In response to receiving the confirmation, the beverage ordering manager service 102 can cause a digital pass such as an entry pass, a priority pass, a preferential treatment pass, a VIP pass, or the like to be sent to, stored at, and/or displayed at the first user device 122. The digital pass can be a particular word, phrase, code, image, icon, and/or combination thereof (e.g., similar or identical to the order image). The digital pass can be identifiable by retailer personnel tasked with regulating entry into the retail establishment 104 and/or a host or hostess, bartender, a server, or the like inside the establishment 104. Accordingly, the user 106 carrying the user device 110 is permitted preferential entry or access (e.g., skipping the line) or other preferential services or benefits from the retail establishment 104 (e.g., discounts, specials, priority queue in a virtual priority line, VIP access, etc.), in response to agreeing to the commitment to fulfill the entry metric.

In some instances, the digital pass can be a priority pass that places the user 106 in a VIP or priority queue, such as a virtual priority queue facilitated by the beverage ordering manager service 102. The virtual priority queue may be a shorter and/or a faster queue than the primary queue for the general public. Moreover, services of the beverage ordering manager service 102 can use the data indicating that the user 106 is in the virtual priority queue, for instance, to prompt the user 106 with offers, requests, or other information, that can be used while in the virtual priority queue. In some instances, the guest tracking services 318, the ordering services 322, a promotional service, a discount service, and the like can send offers to the user device 110 based on an indication that the user device 110 is in the virtual priority queue (e.g., in response to receiving the commitment to fulfill the entry metric) and/or the user device 110 is within the predetermined distance 126 of the retail establishment 104. The predetermined distance 126 can be a walkable distance (e.g., one or more tenths of a mile, two tenths of a mile, half a mile, one mile, two miles, and the like). In some examples, multiple retail establishments 104 can be within the predetermined distance 126 (e.g., two tenths of a mile, half a mile, etc.) and these close proximity establishments can send the user device 110 offers in response to the user 106 entering the virtual priority queue. By way of example, one or more close proximity establishment(s) can send an offer for a quick beverage that is fast or already prepared (e.g., one or more shots at the bar), a discount, an offer to not wait in any line, and the like. Offers from the close proximity retail establishment(s) can also be in response to the user 106 committing to another entry metric designed for people in the virtual priority queue (e.g., a discount in response to bringing a predetermined amount of people such as six people, a discount for shots at the bar, a discount for switching establishments, and the like). In some examples, the same retail establishment 104 for which the user 106 is in the virtual priority queue can also send offers to the user device 110 in response to the user 106 confirming the entry commitment and/or entering the priority virtual queue (e.g., shots at the bar, beverages to drink while waiting, etc.). In some examples, the beverage ordering manager service 102 can determine that a user 106 drove (e.g., based on location data), and, in response, change or prevent an offer from being sent to the user device 110.

In some instances, the beverage ordering system 202 manages beverage orders for the retailer device(s) 108 and/or the user device(s) 110 by storing and accessing data stored at one or more database(s) 136. For instance, the one or more database(s) 136 can store the retailer inventory data 116 received from the retailer device 108, the standardized product schema 118 (which can be based on data received from beverage vendor systems 214 and other systems discussed in greater detail below regarding FIG. 2), the user profile data 124 including preference data, the operational service data 128 for facilitating transactions, and other data involved with managing beverage ordering for retail establishments 104 and users 106. The database(s) 136 collect and store multiple types of data from different sources at various beverage ordering stages, and the data can be continuously updated, as discussed herein. As such, the beverage ordering manager service 102 can provide consistent and streamlined beverage ordering for the user 106 across multiple, different retail establishments 104. Moreover, the data in the database(s) 136 can be aggregated and associated with corresponding user profiles to generate order histories from visits to the multiple, different retail establishments 104 which can, in turn, be used to generate the preferences.

Additional services provided by the beverage ordering manager service 102 that improve the beverage ordering process for retail establishments 104 and users 106 (e.g., customers) are discussed in greater detail below.

Turning to FIG. 2, the example system 100 can include and/or interact with various systems to manage beverage orders for the retailer device 108 and the user device(s) 110. The beverage ordering system 202 that provides the beverage ordering manager service 102 can interact with the various systems through a network 204 (e.g., using one or more network connections 206). The network 204 includes any type of network, such as the Internet, an intranet, a Virtual Private Network (VPN), a Voice over Internet Protocol (VoIP) network, a wireless network (e.g., Bluetooth), a cellular network (e.g., 4G, 5G, LTE, etc.), satellite, combinations thereof, etc. The network 204 provides access to and interactions with the beverage ordering manager service 102. The network 204 can include a communications network(s) with numerous components such as, but not limited to gateways routers, servers, and registrars, which enable communication across the network 204. In one implementation, the communications network(s) includes multiple ingress/egress routers, which may have one or more ports, in communication with the network 204. The user device(s) 110 and/or the retailer device 108 can access, and be accessed by, the network 204 via the communications network, which may be a public switched telephone network (PSTN) operated by a local exchange carrier (LEC) and/or a wireless network, as discussed above. The communications network(s) may communicate with the network 204 through a media gateway device. Communication via any of the networks can be wired, wireless, or any combination thereof.

The beverage ordering system 202 can also include at least one server 208 hosting a website or an application that retailer systems 210 and/or guest user systems 212 may visit to access the beverage ordering manager service 102 and/or other network components or related services. The website or application can receive inputs from the retailer systems 210 (e.g., onboarding inputs, operational service inputs, etc.) and from the guest user systems 212 (e.g., beverage selection inputs, user profile creation inputs, etc.) and analyze the inputs to generate outputs which provide the beverage ordering manager service 102. The server 208 may be a single server, a plurality of servers with each such server being a physical server or a virtual machine, or a collection of both physical servers and virtual machines. In another implementation, a cloud hosts one or more components of the system 100. The server 208 may represent an instance among large instances of application servers in a cloud computing environment, a data center, or other computing environment. The server 208 can access data stored at the one or more database(s) 136. The retailer systems 210, the guest user systems 212, the systems 100 and 300-500, the server 208, and/or other resources connected to the network 204 may access one or more other servers to access one or more websites, applications, web services interfaces, storage devices, computing devices, or the like that are used to provide the beverage ordering manager service 102. The server 208 can also host a search engine that retailer systems 210 and guest user systems 212 use for searching accessing, and/or selecting beverage product identifiers (e.g., representing beverage products, modifiers, recipes, pours, etc.) in the standardized product schema 118. The beverage ordering manager service 102 may utilize a cloud messaging service using the network 204 to facilitate real time communication with the retailer systems 210 and/o the guest user systems 212. The retailer systems 210 and/or the guest user systems 212 can access and interact with the beverage ordering manager service 102 with software running on, for instance, the user device(s) 110 or retailer device(s) 108 utilizing an interface such as an application programming interface (API) and/or through web portals. Stated differently, the API can be called from an application or other software on the user device(s) 110 and retailer device(s) 108 to pull or push data to and from the beverage ordering system 202 over the network 204.

In some instances, the system 100 includes beverage vendor systems 214 to provide beverage product data for the standardized product schema 118. The beverage vendor systems 214 can be associated with one or more beverage distributors, wholesalers, and/or manufacturers and can include data indicating specific details of particular beverage products. For instance, the beverage vendor systems 214 can provide lists of beverage products (e.g., beer, wine, liquor, specialty beverages, etc.) and details associated with the beverage products (e.g., flavor, alcohol content, volume, packaging such as can or bottle, style, type, locality of origin, sales tax code, reviews, etc.). A standardized product schema system 216 of the beverage ordering system 202 can receive the lists of beverage products and data associated with the beverage products from the beverage vendor systems 214 and aggregate the beverage product data into the standardized product schema 118 (e.g., by representing the beverage product data with a plurality of product identifiers). The beverage vendor systems 214 can include dozens, hundreds, or even thousands of different beverage distributors, wholesalers, and/or manufacturers providing beverage product information for the standardized product schema 118. As such, the standardized product schema 118 can be a global product schema comprehensively cataloging thousands of beverage products from different vendors along with millions of details associated with the beverage products with the beverage products and associated details being correlated with product identifiers The standardized product schema system 216 can receive and/or generate additional product identifiers beyond those provided by the beverage vendor systems 214. For instance, the standardized product schema system 216 can determine a plurality of beverage recipes (e.g., cocktail recipes) including both alcoholic products and non-alcoholic products (e.g., based on a user input or provided by an API of a recipes system). In the standardized product schema 118, the recipes can be associated with product identifiers indicating the recipes, and the ingredients of the recipes can also be associated with product identifiers. In this way, for some beverage products, the standardized product schema 118 can be organized hierarchically with the ingredients as subcomponents of recipes. The standardized product schema 118 can also include product identifiers corresponding to beverage modifiers, such as add-ons or changes that are requested for a beverage product (e.g., a soda, a condiment such as bacon, blackberries, olives, celery, etc., whether an item is extra or on the side, and the like). As such, the standardized product schema 118 can include a product identifier and/or a combination of product identifiers to represent any beverage product, modified beverage product, or recipe offered by the retailer systems 210 and/or selected by guest user systems 212.

In some examples, the retailer systems 210 associated with retail establishment(s) 104 interact with the beverage ordering system 202 to onboard the retail establishment(s) 104 and/or to provide operational service for the retail establishment(s) 104. The beverage ordering system 202 can provide the beverage ordering manager service 102 to multiple, different retail establishments 104 that have different retailer systems 210. However, the different inventory data provided by the different retail establishments 104 can be mapped to the standardized product schema 118, normalizing the different inventory data into a unified or common format.

In some instances, the retailer systems 210 include the retailer device(s) 108, the POS system(s) 112, web portal(s) and/or application(s) 218, and/or inventory imaging device(s) 220. The retailer device(s) 108 can include one or more of desktop computers, laptops, tablets, phones, or other devices (e.g., as discussed in greater below regarding FIG. 3). The retailer device(s) 108 can be any combination of back-office devices and front-of-the-house devices. Moreover, the retailer device(s) 108 can include corporate management devices of the retail establishment 104 at a different location (e.g., a remote location) from the retail establishment 104. The retailer device(s) 108 can provide a user interface for receiving input from retail personnel and a display for presenting outputs to the retail personnel. The retailer device(s) 108 can communicate with or be partially or fully integrated with the POS system(s) 112. The POS system 112 can be a device at the retail establishment 104 (or in remote communication with the retailer device 108 at the retail establishment 104) for executing transactions between the retail establishment 104 and guests (e.g., the user(s) 110) at the retail establishment 104. For instance, the POS system 112 can include one or more of a card or chip reader, a kiosk, a terminal, a mobile POS (e.g., a tablet or a smart phone), a barcode scanner, a cash drawer, a keyboard, a receipt printer, and the like. The POS system 112 can include software to manage and execute beverage order transactions. For instance, the POS system 112 can use one or more transaction category codes for tracking and identifying particular items in the transactions. In some instances, the beverage ordering system 202 integrates with the POS system 112 by mapping transaction category codes of the POS system 112 to the product identifiers of the standardized product schema 118. The retailer systems 210 can also include the web portal(s) and/or application(s) 218 for receiving input for and executing any of the operations of the retailer device 108 and/or the POS system 112 discussed herein.

In some instances, the retailer systems 210 can include one or more inventory imaging device(s) 220. The inventory imaging device(s) 220 can include hardware for capturing data from products located at the retail establishment(s) 108 and converting the captured data into beverage product data (e.g., the retailer inventory data 116). For instance, the inventory imaging device(s) 220 can include a camera either integrated into the retailer device(s) 108 or separate from the retailer device(s) 108. As part of the onboarding process, retail personnel can take photos of the inventory with the inventory imaging device 220, and image/text recognition software (e.g., of the retailer systems 210 and/or of the beverage ordering system 202) can determine beverage product data corresponding to the inventory (e.g., a beverage category, a beverage name, a brand, a flavor, alcohol content, volume, packaging such as can or bottle, style, type, locality of origin, sales tax code, etc.). Additionally or alternatively, the inventory imaging device(s) 220 can include a bar code scanner or QR code scanner for scanning a bar code or QR code on the inventory product and converting the bar code into the beverage product data. Accordingly, the inventory imaging device(s) 220 can streamline and simplify the onboarding process by quickly gathering the information related to the inventory for the retail establishment 104, and converting the information into the retailer inventory data 116 which can be sent to the beverage ordering system 202 to be mapped to the standardized product schema 118.

In some examples, the system 100 includes the guest user systems 212 for creating user profiles and placing beverage orders associated with the user profiles. The guest user systems 212 include the user device(s) 110 which can be a computer, a desktop computer, a laptop computer, a cellular or mobile device, a smart mobile device, a wearable device (e.g., a smart watch, smart glasses, a smart epidermal device, etc.) an Internet-of-Things (IoT) device, a smart home device, a medical device, a virtual reality (VR) or augmented reality (AR) device, a vehicle (e.g., a smart bicycle, an automobile computer, etc.), combinations thereof, and the like. The user device(s) 110 may be carried with the customer or user 106 into the retail establishment 104 and/or the user device(s) 110 can be located remotely from the retail establishment 104 (e.g., at a residency of the customer or user 106) for remote beverage ordering. The guest user system(s) 212 can also include location tracking 222 associated with the user 106 (e.g., and/or the user device(s) 110). For instance, the user device 110 can include a GPS tracking system to calculate GPS coordinates associated with user device. The GPS coordinates calculated by the location tracking 222 can be sent to the beverage ordering system 202 and/or to the retailer systems 210 through the network 204. The location tracking 222 can also be a near field communication that determines the location of the user device 110 based on a proximity of the user device 110 to other devices (e.g., the retailer device 108 and/or another user device 110).

The guest user systems 212 can also include notifications 224. For instance, the user device(s) 110 can be a smart phone, a wearable device, or another mobile device executing an application that, upon receiving permission from the user 106, triggers notifications (e.g., in response to messages received over the network 204). The notifications 224 can provide indications on the user device 110 that the user device 110 arrived at the retail establishment; a beverage preference is available for selection; a beverage item is available or not available for selection; a beverage order is ready for pick up; a guest user visit is requested; a friend is offering to buy a beverage or round; information is requested (e.g., whether the user 106 has an open tab, what type of bill the user 106 prefers, etc.); a beverage order is canceled or unfulfillable; a beverage order has a particular status; a beverage order is being made; an authorization associated with the user 106 is revoked or changed; a paper bill is ready for pickup by the user 106; a receipt or drink order is ready for viewing; the user device 110 is within the predetermined distance 126 of the retail establishment 104 using the beverage ordering manger service 102; the second user device 130 with the friend association is within the predetermined distance 132; a friend association has been created; and the like.

Figure 3:
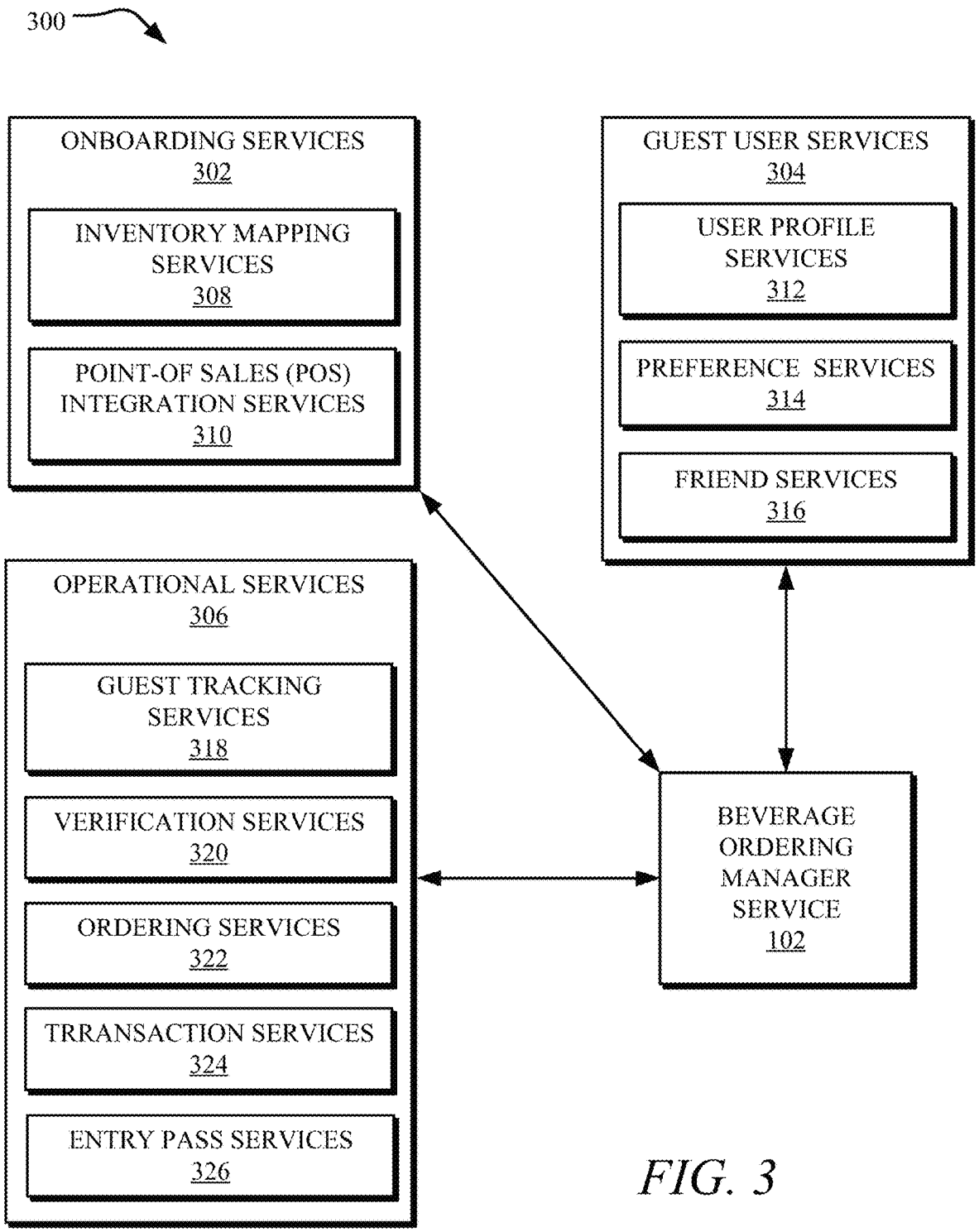
FIG. 3 illustrates an example plurality of services for dispatching beverage ordering.

FIG. 3 illustrates an example system 300 for providing the beverage ordering manager service 102, which can form at least a portion of the system 100. As shown in FIG. 3, the beverage ordering manager service 102 can include a variety of services, such as onboarding services 302, guest user services 304, and operational services 306. Although the services depicted in FIG. 3 are illustrated as distinct components, it is to be understood that any of the services or their sub-services depicted in FIG. 3 can be combined and/or performed in parallel with any other of the services or sub-services.

In some examples, the beverage ordering manager service 102 includes the onboarding services 302 for initiating the beverage ordering manager service 102 at the retail establishment 104. As discussed above, the onboarding services 302 can include inventory mapping services 308 and/or POS integration services 310. For instance, the beverage ordering manager service 102 can connect to the retailer device 108 and receive onboarding input data from the retailer device 108 via the first network connection 114. As part of the inventory mapping service 308, the beverage ordering manager service 102 receives the retailer inventory data 116 from the retailer device 108 and maps the retailer inventory data 116 to the standardized product schema 118 (e.g., correlating retailer inventory data 116 to the plurality of product identifiers from the standardized product schema 118). For instance, the inventory imaging device 220 can be used to scan beverage products at the retail establishment 104 and the text/image recognition procedure and/or the bar code reader can convert the scan into the retailer inventory data 116. A matching or comparison algorithm can determine which items of the retailer inventory data 116 correlate to which product identifiers of the standardized product schema 118. For example, a beverage item which is a 750 ml bottle of Tito's vodka may be scanned by the inventory imaging device(s) 220 (e.g., photographed or bar code scanned). The scan is converted into the retailer inventory data 116 which is then mapped to the standardized product schema 118. In this case, the scanned beverage item can be mapped to a first product identifier indicating a beverage category (e.g., a first category of alcohol such as "vodka"), a second product identifier indicating a beverage style (e.g., a first sub-category of the first category such as "unflavored"), a third product identifier indicating a beverage type (e.g., a second sub-category of the first category or the first sub-category such as "filtered"), a fourth product identifier indicating an alcohol percentage or ABU value (e.g., "40% alcohol by weight"), a fifth product identifier indicating a volume (e.g., "750 ml"), a sixth product identifier indicating a locality of origin (e.g., "USA," "Texas," and/or "Austin, Texas"), any number of product identifiers indicating recipes associated with the beverage category, type, or style, (e.g., "martini," "screwdriver," "vodka Red Bull®,"), and/or any number of product identifiers indicating any other sub-categories associated with the scanned beverage product. Accordingly, the retailer inventory data 116 (e.g., generated by the inventory imaging device(s) 220) can be mapped to the standardized product schema 118.

In some instances, the onboarding service 302 includes the initial intake process facilitated by the streamlined, multi-step, intuitive navigator (e.g., an onboarding wizard), which provides multiple prompts and selectable options to speed up the onboarding process. The initial intake process can capture a majority of the retailer inventory data 116 (e.g., 90%), so that the retailer device 108 can quickly deploy and initiate the operational services 306 to receive beverage orders and execute transactions, even if all of the retailer inventory data 116 is not yet captured. Remaining retailer inventory data 116 can be provided to the beverage ordering manager service 102 via updates while the retailer device 108 is operational to receive drink orders. For example, a beverage order received at the retailer device 108 may correspond to a beverage item that has not yet been mapped to the standardized product schema 118 and, in response, the beverage ordering manager service 102 can cause a prompt to be presented at the retailer device 108 to add the unmapped beverage item to the standardized product schema 118. As such, the system 300 can reduce an amount of time to gather the retailer inventory data 116 so that the retail establishment can rapidly deploy the beverage ordering manager service.

In some examples, the onboarding services 302 can include POS integration services 310 for establishing a communication interface between the beverage ordering manager service 102 and the POS system 112 so the beverage ordering manager service 102 can execute transactions at the POS system 112. The POS integration services 310 can include one or more APIs for sending API calls to an API of the POS system 112 requesting POS-related data. Additionally or alternatively, the POS integration services 310 can include a user interface (UI) for receiving POS-related data input from retail personnel. Through API calls and/or received input, the POS integration services 310 can determine the POS-related data such as a POS device manufacturer, a POS device model number, a POS device IP address, POS authentication data, a POS system transaction category code, POS transaction data, and/or other information utilized by the beverage ordering manager service 102 to instruct the POS system 112 to execute transactions.

In some examples, the beverage ordering manager service 102 provides guest user services 304 to guest user systems 212 (e.g., user devices 110), such as user profile services 312 for creating and/or storing user profile data 124; preference services 314 for generating and utilizing preferences associated with the user profile data 124; and friend services 316 for managing friend associations of the user profile data 124.

The user profile services 312 of the beverage ordering manager service 102 can include one or more UIs for requesting and/or receiving the user profile data 124 as user input (e.g., at the user device(s) 110). The user profile data 124 can include a user name or identifier, a user age, a user phone number, a user driver's license number, a user address, and the like. In some instance, the user profile services 312 can communicate with or form a part of the other services of the beverage ordering manager service 102 to associate interactions of the other services with user profiles (e.g., the user profile associated with the user device 110).

In some examples, the guest user services 304 include preference services 314 for analyzing order histories associated with the user profile data 124, generating beverage preferences based on the order histories, and presenting indicators of the preferences at the guest user systems 212 (e.g., as recommendations for beverage orders). The preference services 314 can access an order history stored in the database(s) 136 and perform a rationalized perato analysis on the order history to generate the preference, which can be performed periodically (e.g., hourly, daily, weekly, etc.). The rationalized perato analysis assesses the results of the orders in the order history and identifies commonalities between the orders. For instance, the order history can be mapped to the standardized product schema 118, and components of the order history can be organized as a decision tree according to the hierarchy of product identifiers discussed above (e.g., beverage category; first beverage sub-category, second beverage sub-category, third beverage sub-category, beverage item). The rationalized perato analysis can identify particular branches of the decision tree that are most commonly associated with orders, which can correspond to any level of detail. In other words, the preference services 314 can identify that a particular item is statistically more commonly ordered than other items such as particular beverage items, modifiers, flavors, localities of origin (e.g., based on sales tax codes), beverage category (e.g., beer, wine, liquor), beverage sub-category (e.g., type of beverage, style of beverage, etc.), recipe, and/or combinations thereof. The preference services 314 can determine the preference based on the beverage item or a component of the beverage item being related to approximately between 20-30% of orders associated with the user profile. A size dimension of the indicator representing the preference can be based on the percentage frequency (e.g., the likelihood) of the preference calculated by the rationalized perato analysis. In other words, stronger preference determinations can be represented by larger indicators. By generating preferences using the multi-layered standardized product schema 118 and the rationalized perato analysis, preferences can be generated at various levels of specificity to match the varying specificities of the human taste. For instance, based on the analysis of the order history, a preference can have high-specificity, such as a "dirty gin martini with extra dry Tanqueray and no olive," which includes a recipe (e.g., "martini"), a category of beverage (e.g., "liquor"), a type of beverage (e.g., "gin"), a beverage manufacturer (e.g., "Tanqueray") a style of beverage (e.g., "extra dry"), and a modifier (e.g., "no olives"). The preference can have a medium-specificity based on the analysis, such as "American grapefruit-flavored beer," which includes a locality of origin (e.g., "American"), a beverage flavor (e.g., "grapefruit"), and a beverage category (e.g., "beer"). Moreover, the preference can have a low-specificity, such as "wine," (e.g., a beverage category). The degree of specificity of the preference is based on the order history, the most commonly ordered attributes associated with the user profile, and/or an amount of product identifiers that can be identified as commonly ordered (e.g., with more than 20% frequency) by the rationalized perato analysis. In other words the specificity of the preference may be very specific and consistent or may be broad and/or vary widely depending on the taste of the user 106.

Multiple benefits result from the preference being based on an order history that is mapped to the same standardized product schema 118 as the retailer inventory data 116 (e.g., in contrast to multiple top down data structures particularized to the retail establishments 104). For instance, beverage order data can be collected from multiple, different retail establishments 104 and standardized or normalized into a common format (e.g., via the mapping) to be included in the order history. As such, the order history can be comprehensive and highly accurate even when the user 106 visits multiple, different establishments. Moreover, the rationalized perato analysis as discussed herein generates accurate preference predictions using minimal input data (e.g. order data corresponding to between three and eight orders) and minimal processing requirements.

The guest user services 304 can also include friend services 316. The friend services 316 can generate and store friend associations indicating linkages between user profiles, and provide a UI for requesting and creating the friend associations. For instance, a first user profile can have a friend association indicating that the first user profile has a "friend" status in relation to a second user profile. The friend status can affect various operational services 306 by causing additional ordering options to be presented at the first user device 110 associated with the first user profile. For instance, the friend status can cause a UI to be presented so the first user device 122 can order a beverage associated with the second user device 130 (e.g., based on the second user device 130 being within the predetermined distance 132 of the first user device 122 or the predetermined distance 126 of the retailer device 108). In some instances, the friend services 316 can communicate with or form a part of the operational services 306, for instance, to detect other users 106 present at the retail establishment 104 and present an option to create friend associations with the other users 106.

In some examples, the beverage ordering manager service 102 provides operational services 306 to retailer systems 210 and guest user systems 212. As noted above, the operational services 306 can interact with and/or be combined with the onboarding services 302 and/or the guest user services 304 to provide a streamlined and intuitive beverage ordering service. For instance, the operational services 306 can include guest tracking services 318 for detecting the presence of the user device(s) 110 at the retail establishment 104; verification services 320 for verifying that a user 106 associated with the user device 110 is authorized to order a beverage; ordering services 322 for presenting beverage items for selection and managing an ordering process between the user device 110 and the retailer device 108; transaction services 324 for executing transactions at the POS system 112 corresponding to the beverage orders; and entry pass services 326 for generating and sending entry passes to the user device(s) 110.

The operational services 306 can include the guest tracking services 318 for detecting the presence of the user device(s) 110 at the retail establishment 104. For instance, the guest tracking services 318 can generate and/or maintain a list of user device identifiers (e.g., and corresponding user profiles) associated with the user device(s) 110 that are detected as being within the predetermined distance 126. When a new user device 110 enters the retail establishment 104 and/or comes within the predetermined distance 126, a new user device identifier associated with the new user device 110 is added to the list of user device identifiers corresponding to the retail establishment 104 and/or the retailer device 108 at the retail establishment. User devices 110 detected by the guest tracking services 318 can be authorized to initiate the ordering services 322 for the retail establishment 104 at which the user device 110 is located.

In some instances, upon determining that the user device 110 is within the predetermined distance 126 of the retailer device 108, the beverage ordering manager service 102 can provide the verification services 320. The verification services 320 can be an aid or tool to assist the bartender so the bartender can determine whether or not to serve the user 106. The verification services 320 can include UIs for the bartender to confirm an age of the user 106 and for the bartender to indicate whether the user 106 is in proper condition for ordering a beverage (e.g., is not overly inebriated). For instance, the verification services 320 can include one or more prompts at the user device 110 to enter a birth date, driver's license information, and/or scan or photograph the driver's license. The verification services 320 can include one or more prompts at the retailer device 108 to request age verification for the user 106 and/or to confirm a state of inebriation for the user 106. In some instances, requisites of the verification services 320 (e.g., an age of the user 106 is 21 years or greater, the user 106 is not visibly inebriated, etc.) are indicated to be satisfied so the bartender can determine to proceed with providing the beverage ordering services.

The ordering services 322 can include multiple operations for presenting beverage item options at the user device 110, receiving a beverage item selection at the user device 110, and facilitating the beverage creation and delivery process for the retailer device 108. In response to the user device 110 being within the predetermined distance 126 of the retailer device, the ordering services 322 can determine a preference associated with the user device 110 (e.g., the user profile associated with the user device 110) using the preference services 314. The ordering services 322 can present a beverage indicator representing the preference at the user device 110. Other beverage indicators representing other beverage items can be presented at the user device 110 (e.g., simultaneously with the preference beverage indicator). In some instances, the ordering services 322 can determine what beverage items are available at the retail establishment 104 (e.g., based on the mapping of the retailer inventory data 116 to the standardized product schema 118), and present beverage indicators at the user device 110 corresponding to available beverage items. The ordering service 322 can receive user input selecting beverage items and various modifications or specifications of the beverage item (e.g., based on selecting words or images representing the beverage items and modifiers).

The ordering services 322 can receive a beverage selection input at the user device 110 selecting a beverage item to order from the retail establishment, such as the preference beverage and/or another beverage. In response, the ordering service 322 can generate a beverage order represented by an order indicator, such as the order image. The order image can be generated via a randomized generation process such that the order image is a unique order image particularized for the transaction.

The beverage ordering manager service 102 can use the order image to verify that the correct beverage order is provided to the user 106 and/or to validate an identity of the user 106. This is achieved by generating the unique order image and presenting the unique order image at both the first user device 122 and the retailer device 108. When the user 106 visits the beverage bar counter or other delivery area, or a server delivers the beverage to the user 106, the user 106 and the server/bartender can visually verify each other's respective identifies by matching the unique order images displayed on both the retailer device 108 and the user device 110. Additionally, the ordering services 322 can cause a first photo associated with the server (or bartender or other retailer personnel) to be displayed at the first user device 122 and a second photo associated with the user profile data 124 to be displayed at the retailer device 108. In some examples, other beverage order indicators can be generated at the user device 110 and the retailer device 108 for match-based verifications, such as a bar code, a QR code, an audio cue, an animation, a video, a photograph, and the like.

In some examples, the beverage ordering manager service 102 receives the beverage order at the retailer device 108 from the user device 110 via the network 204 and organizes the beverage order (e.g., with a plurality of other beverage orders) into one of multiple order preparation categories, such as a pending category, a working category, or a ready category. Beverage orders categorized into the pending category may require an interaction with retail personnel, or some other intermediate ordering step or action, before the drink order can be fulfilled. For instance, a component of the beverage item or the beverage item itself may not be available and/or may be unmapped to the standardized product schema 118. Additionally, the beverage order may be categorized as pending because the user profile associated with the beverage order has a pending authorization or verification. In some instances, the beverage order can be associated with the pending category based on the amount of visits (e.g., being below or above a visits threshold) or the amount of verifications (e.g., being below or above a verifications threshold) associated with the user device 110. Beverage orders are changed from the pending category to the working category when the intermediate action step is resolved (e.g., a substitute is selected, or an authorization/verification is received). A beverage order categorized into the working category is in the process of being prepared or fulfilled by the retail personnel (e.g., the bartender) and/or is queued for fulfillment. The beverage order category can be changed from the working category to the ready category when the beverage item corresponding to the beverage order is prepared and ready for delivery and/or pick up. For instance, the retail personnel preparing the beverage order can provide an order fulfillment-related input at the retailer device 108 indicating that the beverage item has been completed. The beverage order can be categorized into the ready category until a server delivers the beverage order to the user 106 and/or the user visits the order delivery area at the bar counter (e.g., and confirms correct delivery based on matching order images).

Upon fulfilling the beverage order, retail personnel can provide order completion input associated with the beverage order to the retailer device 108, changing the beverage order category to complete. Interactive elements can cause the retailer device 108 to toggle between displaying orders in the different categories (e.g., pending, working, and ready). The beverage order can be presented at the retailer device 108 with a name (e.g., associated with the user profile) or table number corresponding to the beverage order, and/or the beverage order can be represented by the order image as it moves through the different categories during the fulfillment process.

The ordering services 322 can cause the beverage order categories and/or other information related to the beverage order to be displayed at the user device(s) 110. For instance, a UI at the user device(s) 110 can present indications that the beverage order is pending, being prepared (e.g., working), or ready. Additionally, a request for a visit from the user 106 may be received at the retailer device 108 (e.g., to resolve an intermediate step associated with a beverage order in the pending category), and an indication of the request can be presented at the user device(s) 110 (e.g., "please visit the bar"). The ordering services 322 can receive an order completion input from the user 106 at the user device 110.

In some examples, the beverage ordering manager service 102 includes the transaction services 324 for executing the transaction associated with the completed beverage order. For instance, the transaction services 324 can determine that transaction completion input has been received at the retailer device 108 and/or the user device 110 (e.g., that a beverage order has been released from the pending status to the working status), and initiate a transaction process in response. The transaction services 324 can confirm an amount associated with the completed beverage order, determine product identifiers from the standardized product schema 118 associated with the completed beverage order, and/or map the completed beverage order (e.g., using the corresponding product identifiers) to POS system category identifiers. As such, the transaction services 324 can instruct the POS system 112 to execute a transaction corresponding to the released beverage order.

In some instances, the beverage ordering manager service 102 includes the entry pass services 326 for generating and sending an entry pass to the user device 110. The entry pass services 326 can determine that first user device 122 is within the predetermined distance 126 of the retailer device 108. Additionally or alternatively, the entry pass services 326 can receive an indication that the first user device 122 will or intends to enter the retail establishment 104. The beverage ordering manager service can cause a prompt requesting an entry commitment to be presented at the first user device 122. For instance, the prompt can ask the user 106 to commit to fulfilling an entry metric such as paying an entry fee or spending a predetermined amount at the retail establishment 104 on food, drinks, games, and the like (e.g., $20, $30, $40, etc.). The first user device 122 can receive a user input confirming that the user 106 commits to fulfilling the entry metric. In response to receiving the confirmation, the entry pass services 326 can cause an entry pass to be sent to, stored at, and/or displayed at the first user device 122. The entry pass can be generated by the entry pass services 326, for instance, using randomized image generating process similar to that discussed above for generating the order image. The entry pass can include a particular word, phrase, code, image, icon, combination thereof identifiable by retailer personnel tasked with regulating entry into the retail establishment 104, such that the user 106 carrying the user device 110 is permitted preferential entry or access (e.g., skipping the line) or other preferential services or benefits from the retail establishment 104 (e.g., discounts, VIP access, etc.) when the entry pass is presented. The entry pass service 326 can increase revenue for the retail establishment 104 by increasing a percentage of guests that purchase beverages. Various entry metrics and other types of digital passes are discussed in greater detail above.

In some examples, the beverage ordering manager service 102 includes one or more analytics services to perform analytics on data collected from the beverage ordering manager service 102 (e.g., the retailer inventory data 116, the standardized product schema 118, the user profile data 124, the operational service data 128, and the like). For instance, the analytics service can perform retail personnel performance analytics indicating, for instance, to determine a responsiveness of a selected bartender (e.g., based on an analysis of timestamp data corresponding to receiving the beverage order and completing the beverage order), an amount of time per drink for a selected bartender, and the like. Moreover, the analytics services can perform beverage ordering analytics to determine a popularity of a drink (e.g., with respect to a particular region, a zip code, a demographic characteristic such as an age range, and the like). Results of the beverage ordering analytics can be provided to the retail establishment 104 and, in some instances, can be used for advertising placement (e.g., at the user device 110) from third-party services.

Figure 4:
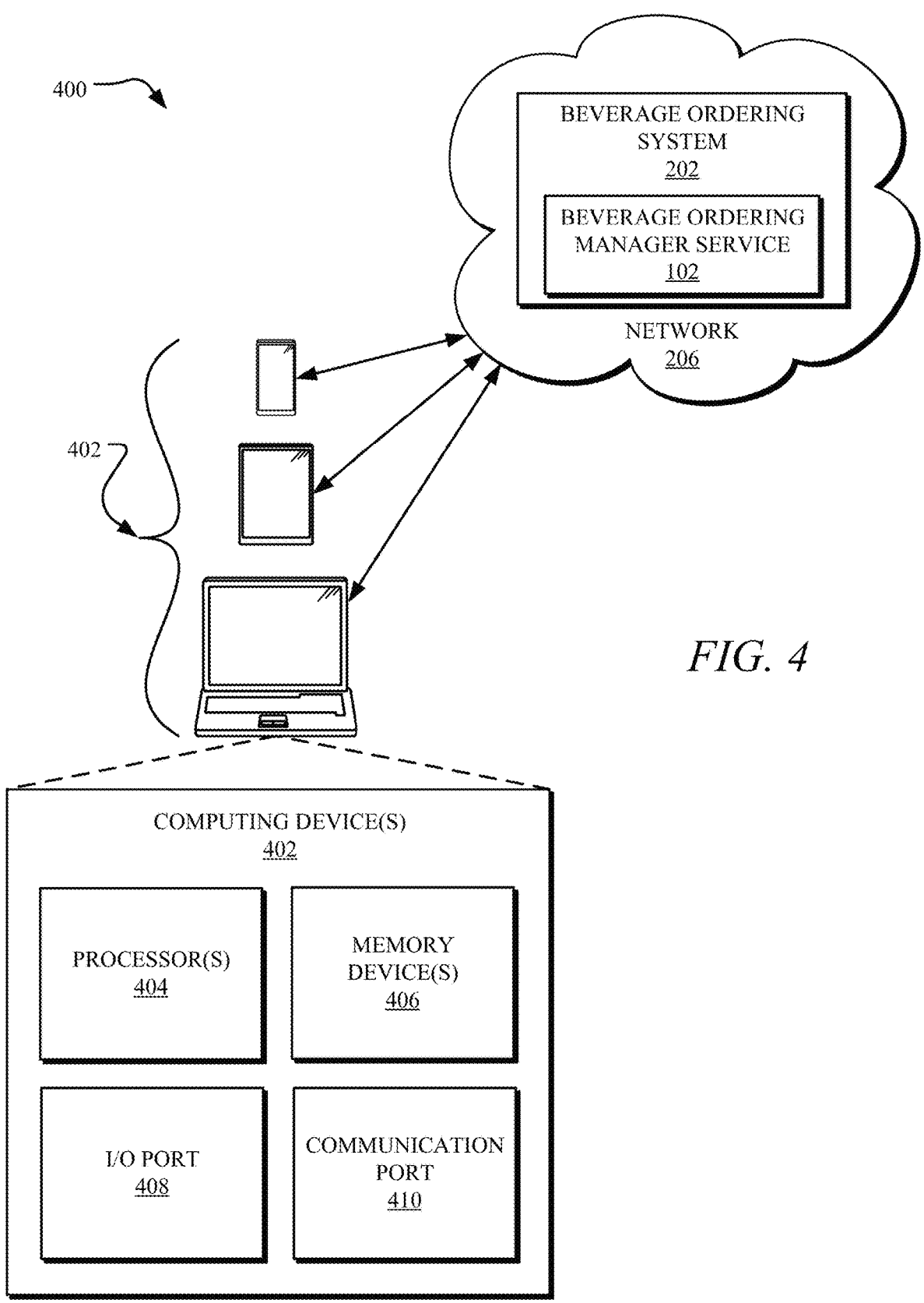
FIG. 4 illustrates example computing devices including operational units arranged to perform various operations of the presently disclosed technology.

Turning to FIG. 4, a network environment 400 includes one or more computing device(s) 402 for operating the beverage ordering manager service 102. In one implementation, the one or more computing device(s) 402 include the retailer device(s) 108, the user device(s) 110, the server 208 and the database(s) 136 hosting the beverage ordering manager service 102, and/or any other devices forming the various systems discussed regarding FIGS. 1-3.

In one implementation, the computing device(s) 402 use the beverage ordering system 202 and/or the systems of FIG. 2 for real-time, interactive beverage ordering. For instance, the beverage ordering system 202 can host beverage ordering sessions (e.g., at a first computing device 402) and transmit and receive text, HTML, video, image, and audio data to and from the user device(s) 110 and/or the retailer device 108 (e.g., a second computing device 402 and/or a third computing device 402). In one implementation, multiple user devices 110 can each host an application facilitating communication between other user devices 110, the retailer device 108 and/or the server 208 of the beverage ordering system 202. The server 208 can maintain a list of identifiers (e.g., at the database(s) 136) including user device identifiers associated with the user device(s) 110, retailer device identifier(s) associated with the retail device(s) 108, POS system identifiers associated with the POS system 112, POS category identifiers associated with the POS system transaction categories, product identifiers identifying beverage products, modifiers, recipes, and other beverage-related data (e.g., organized according to the standardized product schema 118), and/or other identifiers. Within the network environment 400, the beverage ordering system 202 may facilitate beverage ordering for multiple users 106 and multiple retail establishments 104 independent of the type of user device 110 or the type of the retailer device 108 being utilized.

In some instances, the computing device(s) 402 (e.g., the retailer device 108, the user device(s) 110, the POS system 112, etc.) can including a computer, a personal computer, a desktop computer, a laptop computer, a terminal, a workstation, a cellular or mobile phone, a mobile device, a smart mobile device a tablet, a wearable device (e.g., a smart watch, smart glasses, a smart epidermal device, etc.) a multimedia console, a television, an Internet-of-Things (IoT) device, a smart home device, a medical device, a virtual reality (VR) or augmented reality (AR) device, a vehicle (e.g., a smart bicycle, an automobile computer, etc.), and/or the like. The computing device(s) 402 may be integrated with, form a part of, or otherwise be associated with the systems 202 and/or 210-216. It will be appreciated that specific implementations of these devices may be of differing possible specific computing architectures not all of which are specifically discussed herein but will be understood by those of ordinary skill in the art.

The computing device 402 may be a computing system capable of executing a computer program product to execute a computer process. Data and program files may be input to the computing device 402, which reads the files and executes the programs therein. Some of the elements of the computing device 402 include one or more hardware processors 404, one or more memory devices 406, and/or one or more ports, such as input/output (IO) port(s) 408 and communication port(s) 410. Additionally, other elements that will be recognized by those skilled in the art may be included in the computing device 402 but are not explicitly depicted in FIG. 4 or discussed further herein. Various elements of the computing device 402 may communicate with one another by way of the communication port(s) 410 and/or one or more communication buses, point-to-point communication paths, or other communication means.

The processor 404 may include, for example, a central processing unit (CPU), a microprocessor, a microcontroller, a digital signal processor (DSP), and/or one or more internal levels of cache. There may be one or more processors 404, such that the processor 404 comprises a single central-processing unit, or a plurality of processing units capable of executing instructions and performing operations in parallel with each other, commonly referred to as a parallel processing environment.

The computing device 402 may be a conventional computer, a distributed computer, or any other type of computer, such as one or more external computers made available via a cloud computing architecture. The presently described technology is optionally implemented in software stored on the data storage device(s) such as the memory device(s) 406, and/or communicated via one or more of the ports 408 and 410, thereby transforming the computing device 402 in FIG. 4 to a special purpose machine for implementing the operations described herein.

The one or more memory device(s) 406 may include any non-volatile data storage device capable of storing data generated or employed within the computing device 402, such as computer executable instructions for performing a computer process, which may include instructions of both application programs and an operating system (OS) that manages the various components of the computing device 402. The memory device(s) 406 may include, without limitation, magnetic disk drives, optical disk drives, solid state drives (SSDs), flash drives, and the like. The memory device(s) 406 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory device(s) 406 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the memory device(s) 406 which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computing device 402 includes one or more ports, such as the I/O port 408 and the communication port 410, for communicating with other computing, network, or vehicle devices. It will be appreciated that the I/O port 408 and the communication port 410 may be combined or separate and that more or fewer ports may be included in the computing device 402.

The I/O port 408 may be connected to an I/O device, or other device, by which information is input to or output from the computing device 402. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing device 402 via the I/O port 408. Similarly, the output devices may convert electrical signals received from the computing device 402 via the I/O port 408 into signals that may be sensed as output by a human, such as sound, light, and/or touch. The input device may be an alphanumeric input device, including alphanumeric and other keys for communicating information and/or command selections to the processor 404 via the I/O port 408. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing device 402 via the I/O port 408. For example, an electrical signal generated within the computing device 402 may be converted to another type of signal, and/or vice-versa. In one implementation, the environment transducer devices sense characteristics or aspects of an environment local to or remote from the computing device 402, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 402, such as, physical movement of some object (e.g., a mechanical actuator), heating or cooling of a substance, adding a chemical substance, and/or the like.

In one implementation, the communication port 410 is connected to the network 204 and the computing device 402 may receive network data useful in executing the methods and systems set out herein as well as transmitting information and network configuration changes determined thereby. Stated differently, the communication port 410 connects the computing device 402 to one or more communication interface devices configured to transmit and/or receive information between the computing device 402 and other devices by way of one or more wired or wireless communication networks or connections. Examples of such networks or connections include, without limitation, Universal Serial Bus (USB), Ethernet, Wi-Fi, Bluetooth®, Near Field Communication (NFC), and so on. One or more such communication interface devices may be utilized via the communication port 410 to communicate one or more other machines, either directly over a point-to-point communication path, over a wide area network (WAN) (e.g., the Internet), over a local area network (LAN), over a cellular network (e.g., third generation (3G), fourth generation (4G), Long-Term Evolution (LTE), fifth generation (5G), etc.) or over another communication means. Further, the communication port 410 may communicate with an antenna or other link for electromagnetic signal transmission and/or reception.

In an example implementation, retailer data (e.g., retailer inventory data 116), user device data (e.g., user profile data 124), the standardized product schema 118, the operational service data 128 for facilitating beverage ordering sessions, and software and other modules and services may be embodied by instructions stored on the memory devices 406 and executed by the processor 404.

The system set forth in FIG. 4 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized. In the present disclosure, the methods disclosed may be implemented as sets of instructions or software readable by the computing device 402. Further, it is understood that the specific order or hierarchy of steps in the methods disclosed are instances of example approaches. It is understood that the specific order or hierarchy of steps in the method can be rearranged while remaining within the disclosed subject matter. The accompanying method claims present elements of the various steps in a sample order, and are not necessarily meant to be limited to the specific order or hierarchy presented unless explicitly stated.

Turning to FIGS. 5-23, example services of the beverage ordering manager service 102 generated by the beverage ordering system 202 are illustrated. It will be appreciated that various interfaces are used to describe the services, but the interfaces are exemplary only and not intended to be limiting. The interfaces illustrated in FIGS. 5-16 can be presented at the retailer device 108 or retailer systems 210 for providing the onboarding services 302 and/or operational services 306 to the retailer systems 210. The interfaces illustrated in FIGS. 17-23 can be presented at user device(s) 110 (e.g., the first user device 122 and/or the second user device 130) and/or the guest user systems 212. Nevertheless, the interfaces could be presented at other computing devices. Any of the operations or features discussed regarding at least FIGS. 8-23 can constitute or be based on the operational service data 128. In other words, the interfaces depicted in FIGS. 5-23 are used to describe underlying operations performed by the beverage ordering manager service 102 and corresponding data flows and data structures. However, it is to be understood that the interfaces can also include aesthetic, ornamental design features.

Figure 5:
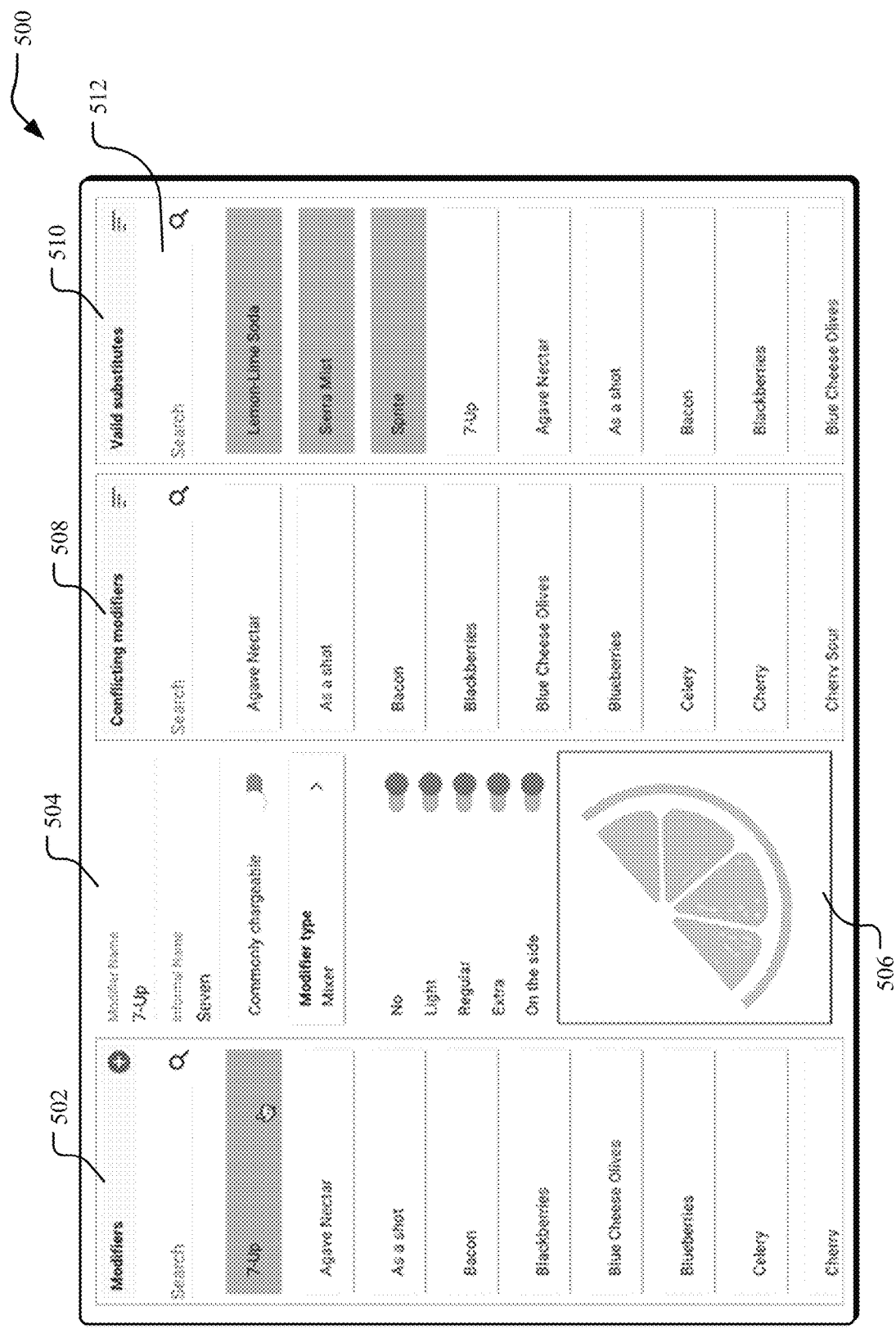
FIG. 5 illustrates an example retailer onboarding interface.

Referring first to FIG. 5, an example onboarding interface 500 is shown for mapping the retailer inventory data 116 to the standardized product schema 118, for instance, as part of the onboarding services 302. The onboarding interface 500 provides a process for the retailer device 108 to indicate which modifiers are available at the retail establishment 104 and mapping the modifiers to the standardized product schema 118. For instance, the onboarding services 302 can present a list of modifiers 502 available to be selected by the retail personnel (e.g., to "enable" the modifier for the retail establishment 104). The list of modifiers 502 includes sodas (e.g., "7-Up), fruits, vegetables, nectars, and other beverage recipe ingredients, a beverage delivery style (e.g., "as a shot"), and the like. The onboarding interface 500 can present modifier details 504 associated with a selected modifier and options for selecting a modifier type (e.g., mixer, garnish, etc.) and indicating whether a modifier is unavailable, light, regular, extra, or on the side. An icon or image 506 associated with a particular selected modifier can be generated with an option for being changed. The onboarding services 302 can generate a list of conflicting modifiers 508 if any exist for the selected modifier. Additionally, a list of valid substitutes 510 for the selected modifier can be generated. Moreover, the onboarding interface 500 can include one or more search fields 512 for searching for a modifier, a conflicting modifier, and/or valid substitutes. The data generated at the onboarding interface 500 related to modifier selections, details, conflicts, and substitutes can be included in the standardized product schema 118 as represented by the plurality of product identifiers.

Figure 6:
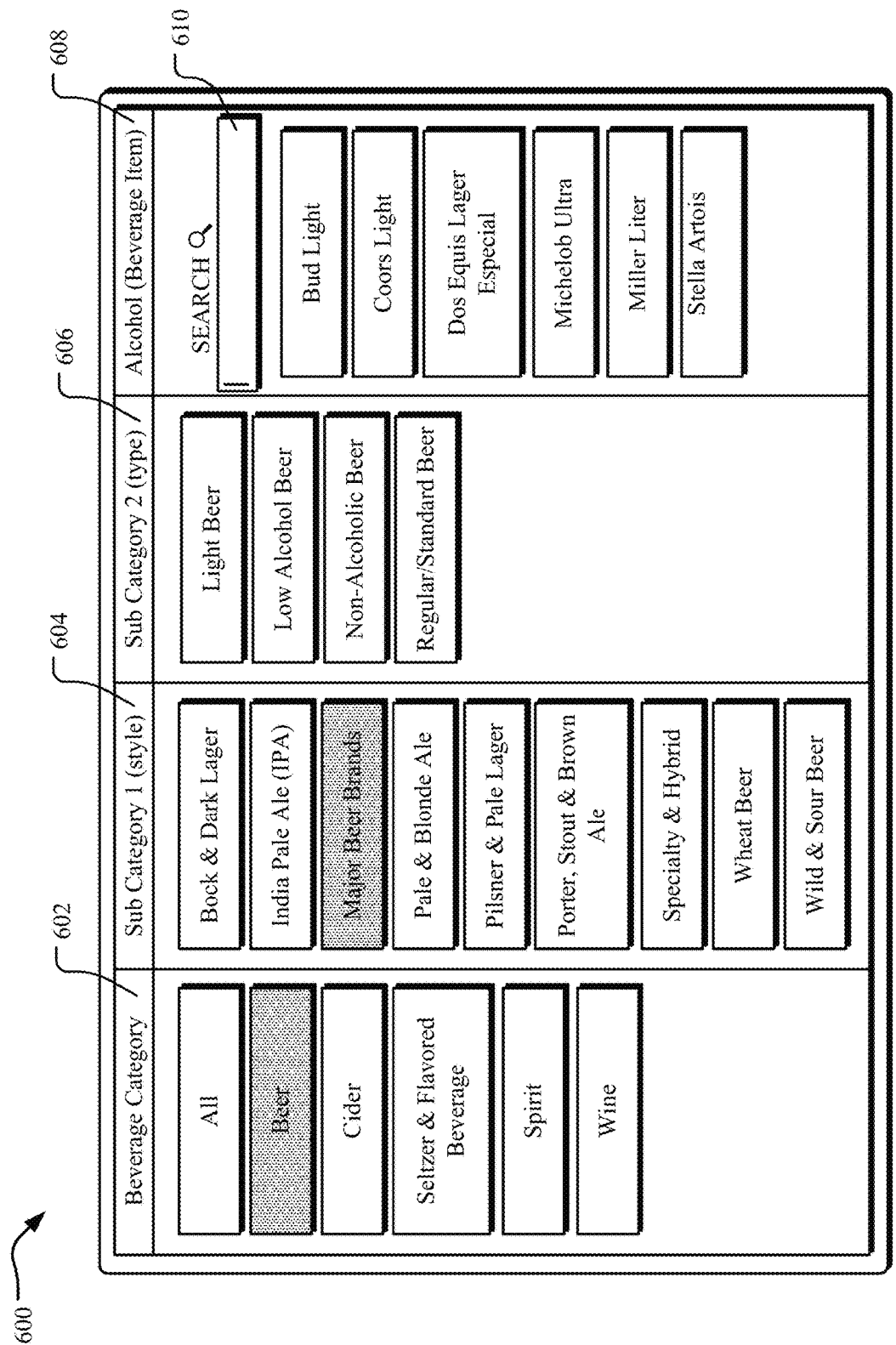
FIG. 6 illustrates an example retailer onboarding interface.

FIG. 6 illustrates an example onboarding interface 600 for mapping the retailer inventory data 116 to the standardized product schema 118, for instance, as part of the onboarding services 302. The onboarding interface 600 provides a process for the retailer device 108 to indicate which beverage items are available at the retail establishment 104 and mapping the available beverage items to the standardized product schema 118 (e.g., "enabling" the beverage items for the beverage ordering manager service 102). The onboarding services 302 can present the beverage items of the standardized product schema 118 at the onboarding interface 600 as multiple categories and sub-categories. For instance, a beverage category list 602 can indicate a plurality of highest-level beverage categories (e.g., all, beer, cider, seltzer & flavored beverages, spirit, wine, etc.). Upon selecting a beverage item from the beverage category list 602 (e.g., beer), the onboarding services 302 can present a first beverage sub-category list 604, which can indicate a style of whichever beverage item is selected from the beverage category list 602. For example, if the "beer" beverage category is selected from the beverage category list 602, the first beverage sub-category list 604 presents styles of beer (e.g., bock & dark lager, India pale ale, major beer brands, pale & blond ale, etc.). In response to a first sub-category or style of beverage being selected from the first beverage sub-category list 604, the onboarding services 302 can present a second beverage sub-category list 606 corresponding to the selected first sub-category. The second beverage sub-category list 606 can include types of beverage corresponding to the selected style of beverage. For instance, if the "major beer brands" beverage sub-category is selected from the first beverage sub-category list 604, the second beverage sub-category list 606 can present types of beers of major beer brands (e.g., light beer, low alcohol beer, non-alcoholic beer, regular/standard beer, etc.). Upon receiving a selection at the second beverage sub-category list 606, the onboarding services 302 can present a list of beverage items 608 corresponding to the selections at the beverage category list 602, the first beverage sub-category list 604, and the second beverage sub-category list 606. The retail personnel can provide input selecting a beverage item from the beverage items 608, causing the selected beverage item to become retailer inventory data 116 mapped to the standardized product schema 118. The onboarding services 302 can present a beverage item search field 610 for searching for particular beverage items in the standardized product schema 118. Although two beverage sub-category lists are illustrated in FIG. 6, the onboarding interface 600 can include any number of sub-category lists to specify particular beverage items and characteristics of the beverage items in an intuitive, easy-to-use manner.

Figure 7:
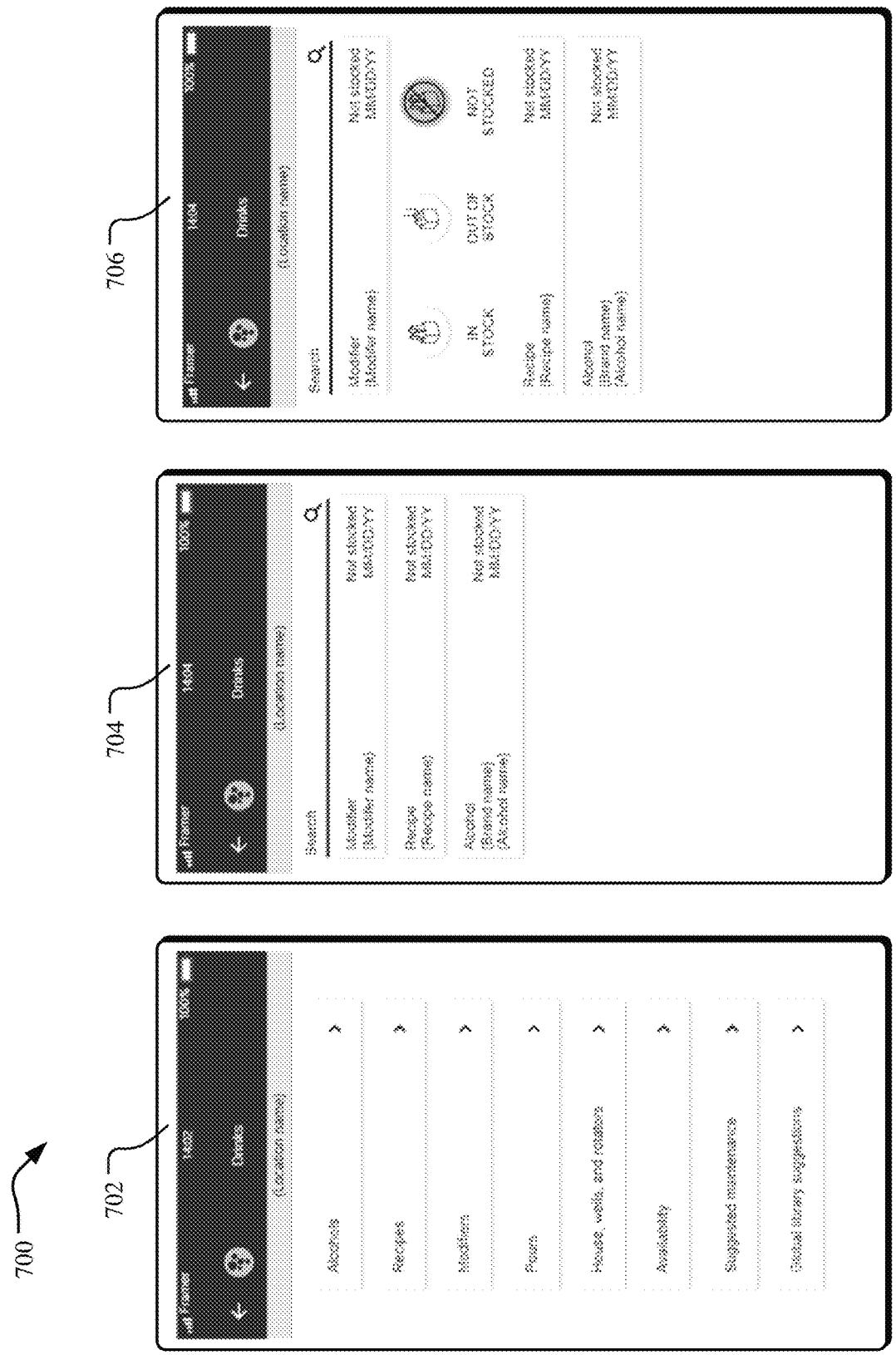
FIG. 7 illustrates example retailer management interfaces.

FIG. 7 depicts example retailer management interfaces 700 provided by the beverage ordering manager service 102 to the retailer systems 210. The retailer management interface 700 can include a first mapping interface 702 for "enabling" (e.g., mapping to) beverage items of the standardized product schema 118 for the particular retail establishment 104. The mapping interface 702 can provide options for adding one or more alcohols, recipes, modifiers, pours, house beverages, well beverages, and/or rotator beverages to the mapping of the retailer inventory data 116 to the standardized product schema 118. Moreover, the mapping interface 702 can include options for indicating an availability of the beverage items, suggested maintenance, and suggestions from a global library (e.g., based on the standardized product schema 118). The mapping interface 702 can be presented as part of the initial intake process of the onboarding services 302 and/or after the beverage ordering manager service 102 is operational at the retailer device 108 to receive beverage orders. The retailer management interface 700 can include a second mapping interface 704 which can indicate whether a particular modifier, recipe, and/or alcohol is currently stocked at the retail establishment 104 (e.g., with a date corresponding to the stocked or not-stocked status). The retailer management interface 700 can include a third mapping interface 706 for changing a status of a beverage item (e.g., a modifier, a recipe, and/or an alcohol) between "in stock," "out of stock," and "not stocked."

Figure 8:
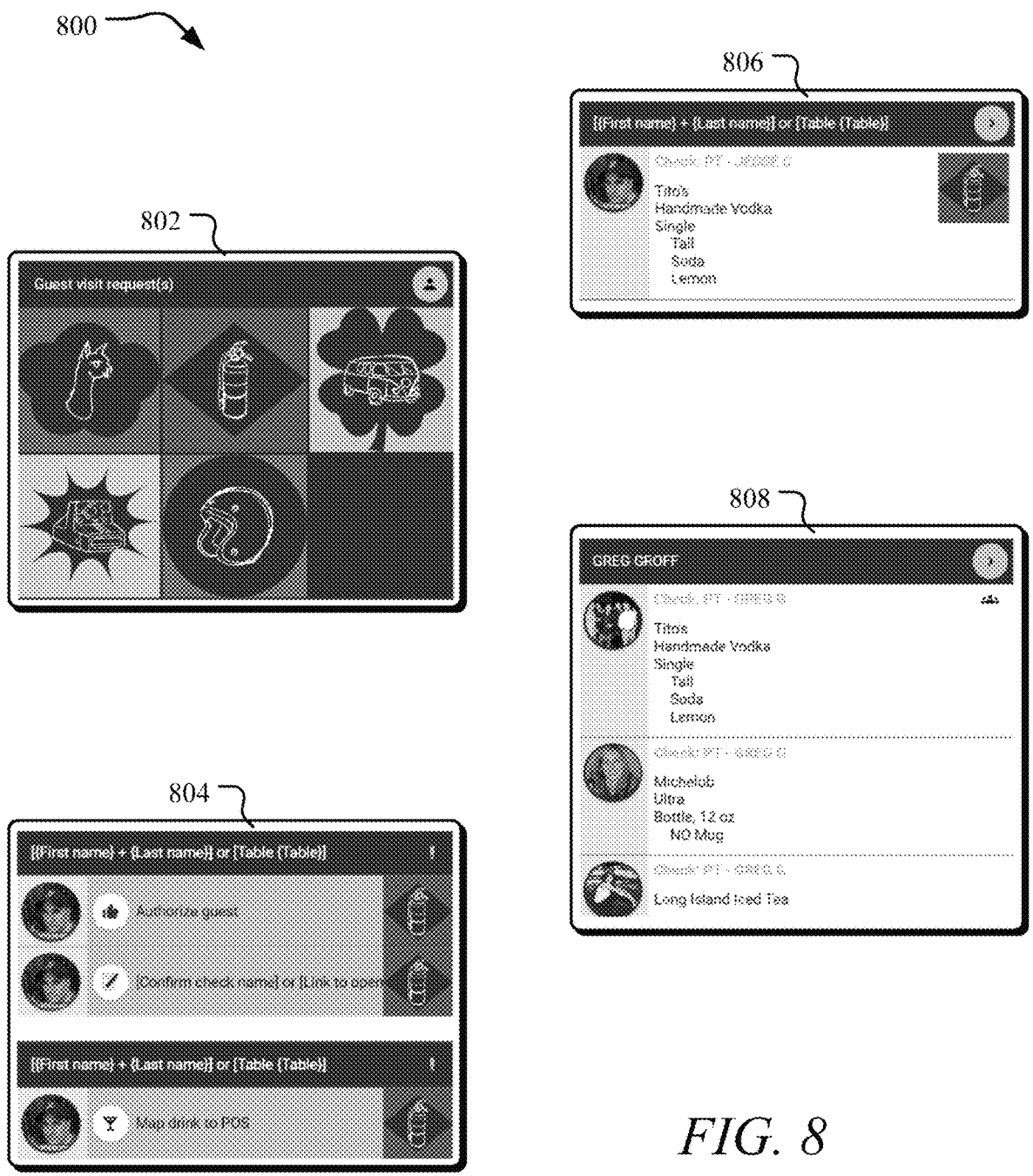
FIG. 8 illustrates example retailer operational services interfaces for dispatching beverage orders.

FIG. 8 depicts example retailer operational service interfaces 800 provided by the beverage ordering manager service 102 to the retailer systems 210. In one implementation, operational services 306 generate an image cue list 802 representing pending tasks for the retail personnel. The image cue list 802 can include a list or array of images (e.g., randomly generated guest images) representing users 106 that have requested a visit to the bar counter. The retailer operational service interface 800 can also include one or more guest action items 804 that can be performed by the retailer device 108. For instance, the guest action items 804, triggerable by user input at the retailer device 108, can authorize the user 106 for beverage service, confirm a name on a check associated with the user 106, link the user profile to an open check, or map a beverage item ordered at the user device 110 to the POS system 112. The guest action items 804 can be presented with a photo associated with the user profile, a guest image associated with the user profile, and/or an order image. The retailer operational service interface 800 can present a bill 806 (e.g., in response to a selection of guest action item 804) and a name and/or table number associated with the user profile or beverage order. The bill 806 can also present the user profile image and the randomly generated unique image representing the beverage order. The retailer operational service interface 800 can present a friend order bill 808 that lists multiple beverage orders (e.g., and the various modifiers and details associated with the multiple beverage orders) with different images corresponding to different user profiles. The friend order bill 808 can include an indication that the check is aggregated into a single transaction associated with one of the user profiles (e.g., by presenting a user profile name or indicator). The aggregated transaction is sent to the POS system 112 as a single transaction.

Figure 9:
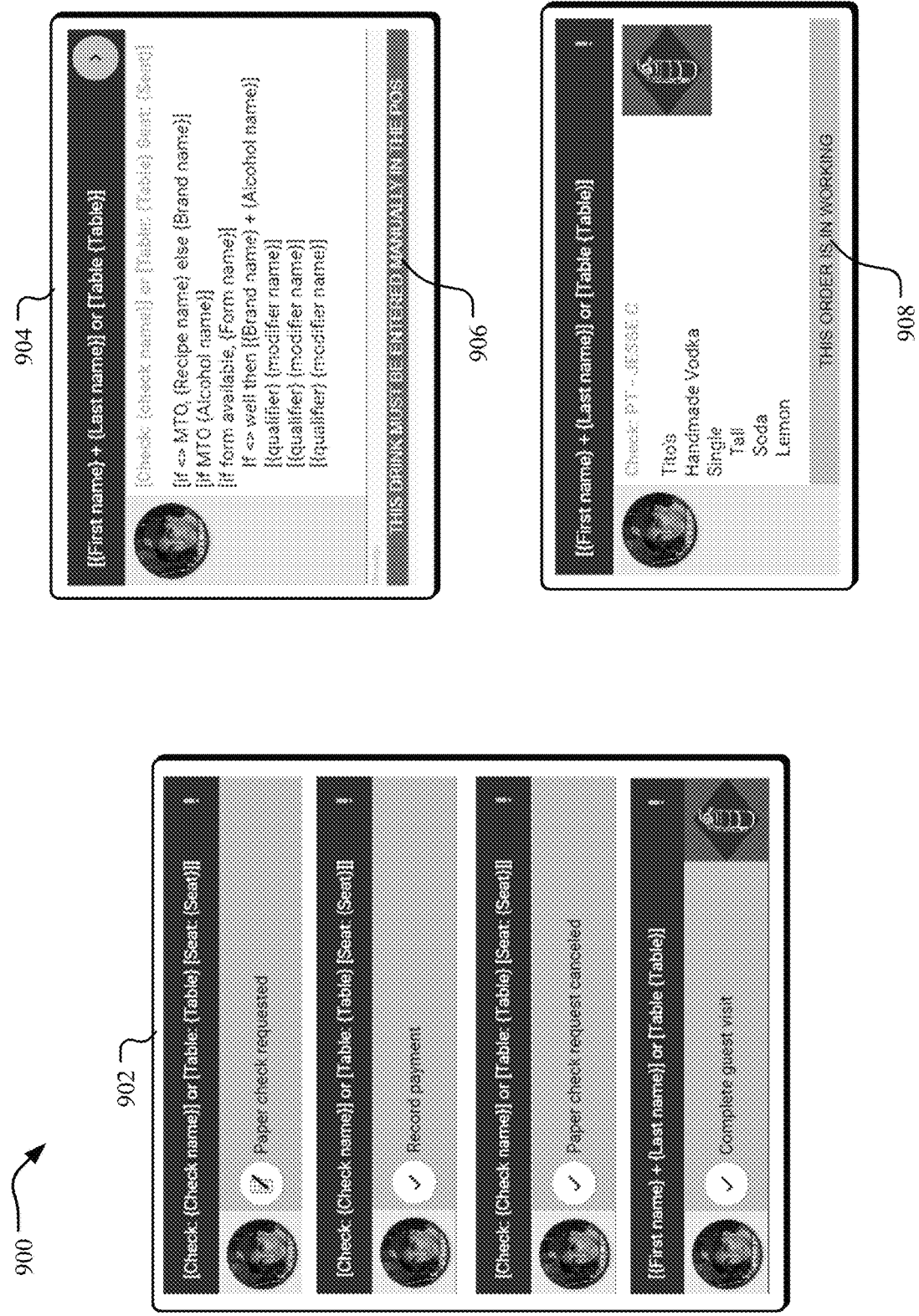
FIG. 9 illustrates example retailer operational services interfaces for dispatching beverage orders and interacting with guests.

FIG. 9 depicts example retailer operational service interfaces 900 provided by the beverage ordering manager service 102 to the retailer systems 210. The retailer operational service interface 900 can include guest action items 902, which may have interactive elements for receiving user input and causing the guest action items 902 to be resolved. The guest action items 902 can include delivering a paper check to the user 106 in response to receiving a request from the user device 110; recording a payment such as a cash payment (e.g., to the POS system 112); closing a guest balance (e.g., by indicating that a guest visit is complete); or receiving an indication that a paper check request from the user device 110 is canceled. Operational services 306 can, in response to generating a bill data structure 904 via the retailer operational service interface 900, determine that one or more beverage items associated with the bill 808 are not mapped to the standardized product schema 118. In response to this determination, the operational services 306 can cause a first indication 906 that a beverage item needs to be manually entered into the POS system 112 to be presented at the retailer device 108. Additionally, the onboarding services 302 can determine an order status associated with the bill 808 and present an order status indicator 908 at the retailer device 108 (e.g., indicating that the beverage order is pending, working, or ready).

Figure 10:
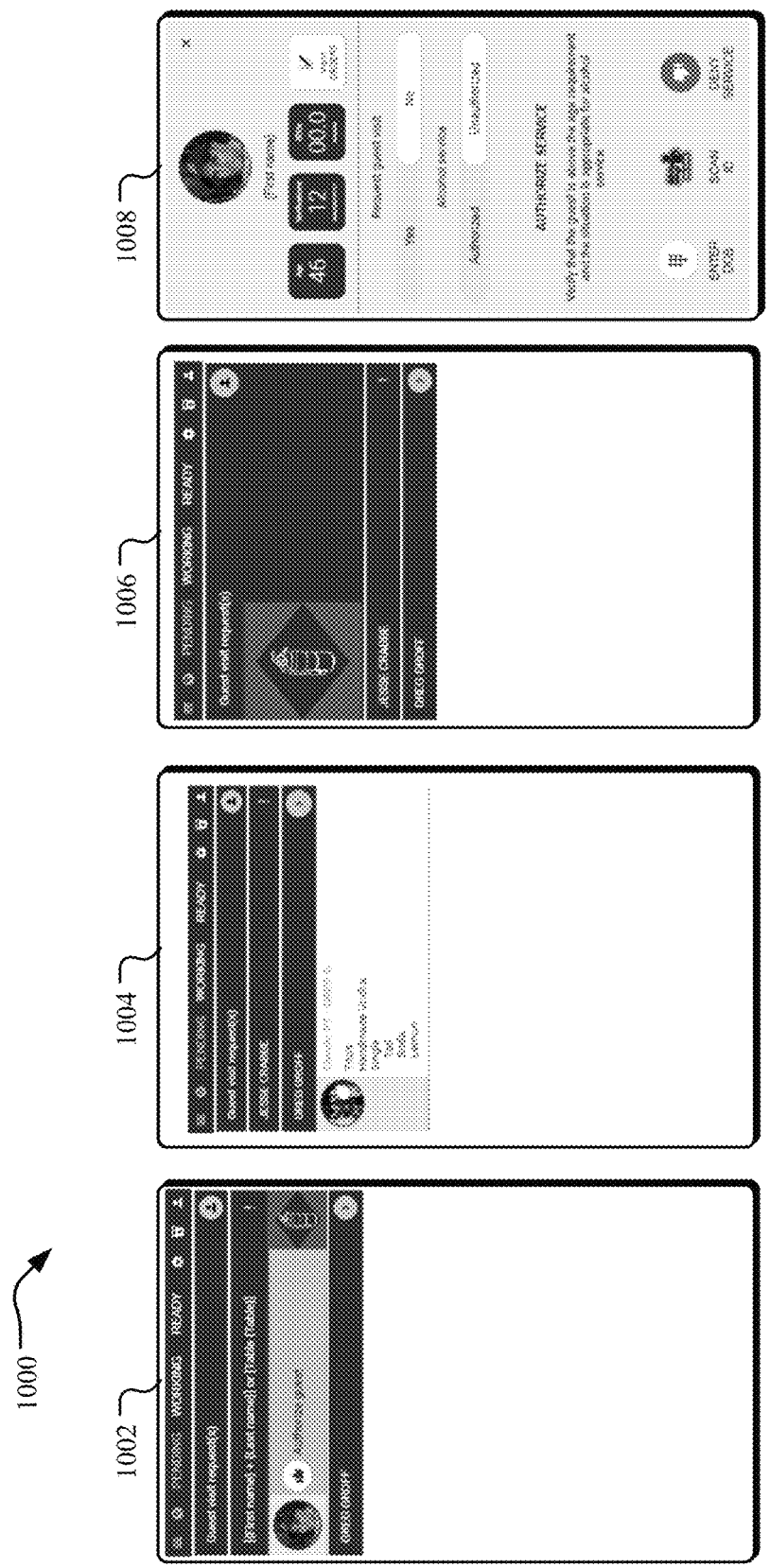
FIG. 10 illustrates example retailer operational services interfaces for managing and categorizing beverage orders into beverage preparation categories.

FIG. 10 depicts example retailer operational service interfaces 1000 provided by the beverage ordering manager service 102 to the retailer systems 210. The operational services 306 can organize the beverage orders into the pending category, the working category, and the ready category. A pending list 1002 can list the beverage orders in the pending category and receive input to authorize a beverage order in the pending category. The retailer operational service interface 1000 can toggle between the different categories in response to the input at the retailer device 108, and can present beverage orders (e.g., including associated user profile photos, order images, and/or authorization triggers) corresponding to the selected beverage category. The operational services 306 can present beverage order details 1004 (e.g., modifiers, beverage categories and subcategories, etc.) of the beverage orders in the different categories. In some examples, the operational services 306 can receive a guest visit request at the user device 110 and generate a guest request indicator 1006 (e.g., with a randomly generated guest visitor image) at the retailer device 108 in response to the guest visit request. The operational services 306 can generate, store, and present (e.g., at the retailer systems 210 and/or the guest user systems 212) guest user visit data 1008, such as an age associated with the user 106, a number of verifications associated with the user 106, and an indication of an amount of standard drink units (SDU)s ordered by the user 106 during the beverage ordering session. For instance, the operational services 306 can determine (e.g., based on product identifiers of the standardized product schema 118) a glassware volume associated with transactions for the user 106, an alcohol percentage associated with the transactions, and calculate the amount of SDUs based on the glassware volume and alcohol percentage. The amount of SDUs can be stored by the beverage ordering system 202 and be accessible by the user device 110 and/or the retailer device 108. The guest user visit data 1008 can also include interactive elements for receiving a retailer input toggling a guest visit request status and/or an alcohol service authorization status. Additionally, the guest user visit data 1008 can include interactive elements for viewing orders associated with the user profile, entering a date-of-birth associated with the user profile, scanning an ID to collect data for the user profile, and/or to deny service for the user profile.

Figure 11:
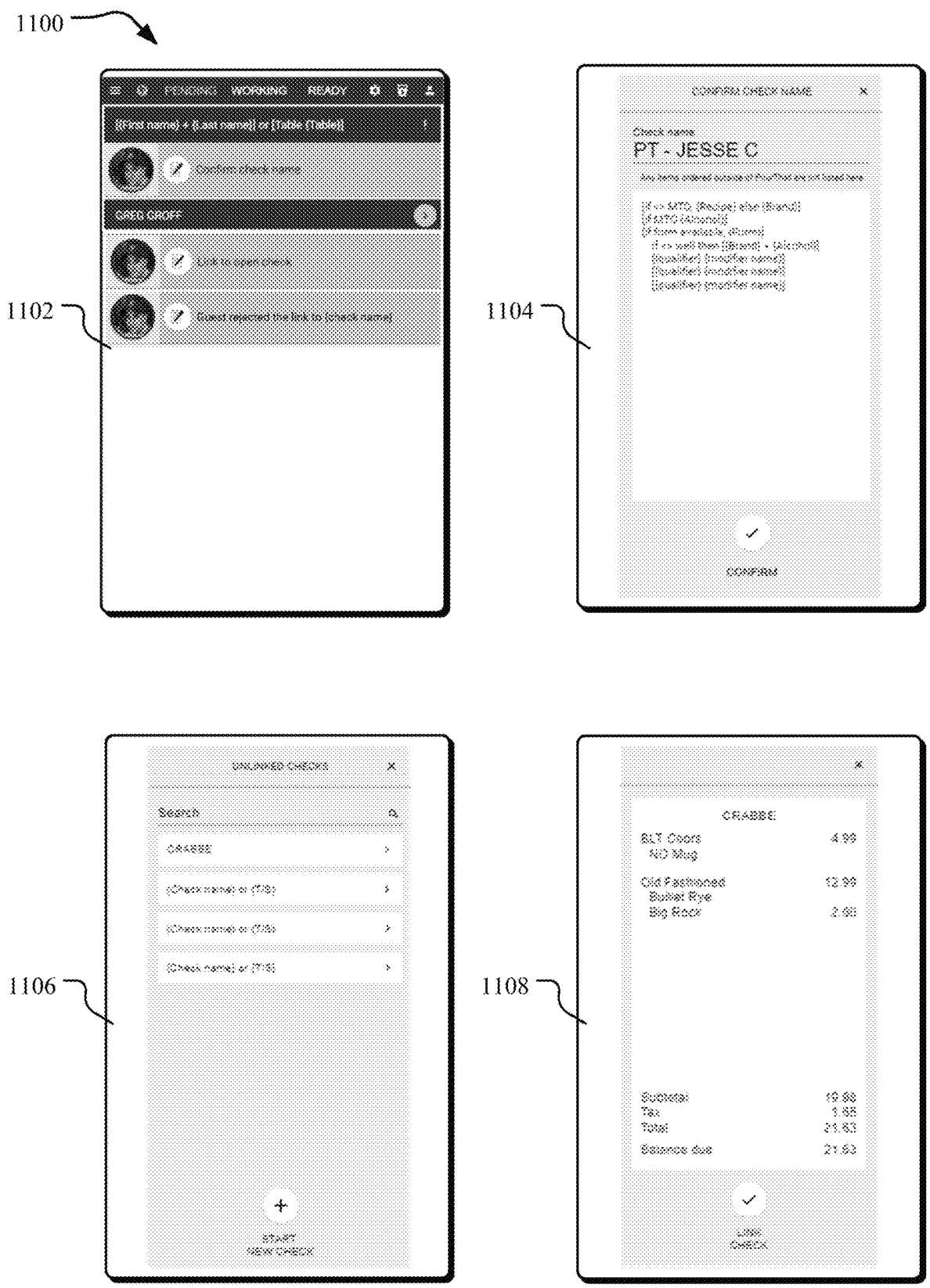
FIG. 11 illustrates example retailer operational services interfaces for generating and linking checks.

FIG. 11 depicts example retailer operational service interfaces 1100 provided by the beverage ordering manager service 102 to the retailer systems 210. The operational services 306 can generate one or more pending order status indicators 1102 requesting an action, such as confirming a check name, linking an open check to a user profile, and/or indicating that the user device 110 received a rejection input associated with the link to the user profile. Additionally, the operational services 306 can aggregate check information 1104 and request a check name confirmation from the retail personnel. In some examples, the operational services 306 can receive an input at the retailer device 108 to cause the beverage ordering manager service 102 to refresh a check being presented at the retailer device 108, unlink the check from the user profile, or resend a request to the user device 110 to link the check. In some instances, the operational services 306 receives search input at a search screen 1106 for unlinked checks, and aggregates checks that lack an association with user profiles. A check 1108 can include multiple beverage orders or every beverage order associated with the user profile and/or the user device 110 during the beverage ordering session (e.g., for the user profile and friends associated with the user profile). The operational services 306 can receive input at the retailer device 108 to start new checks, view beverage order details of the checks, and link checks to user profiles.

Figure 12:
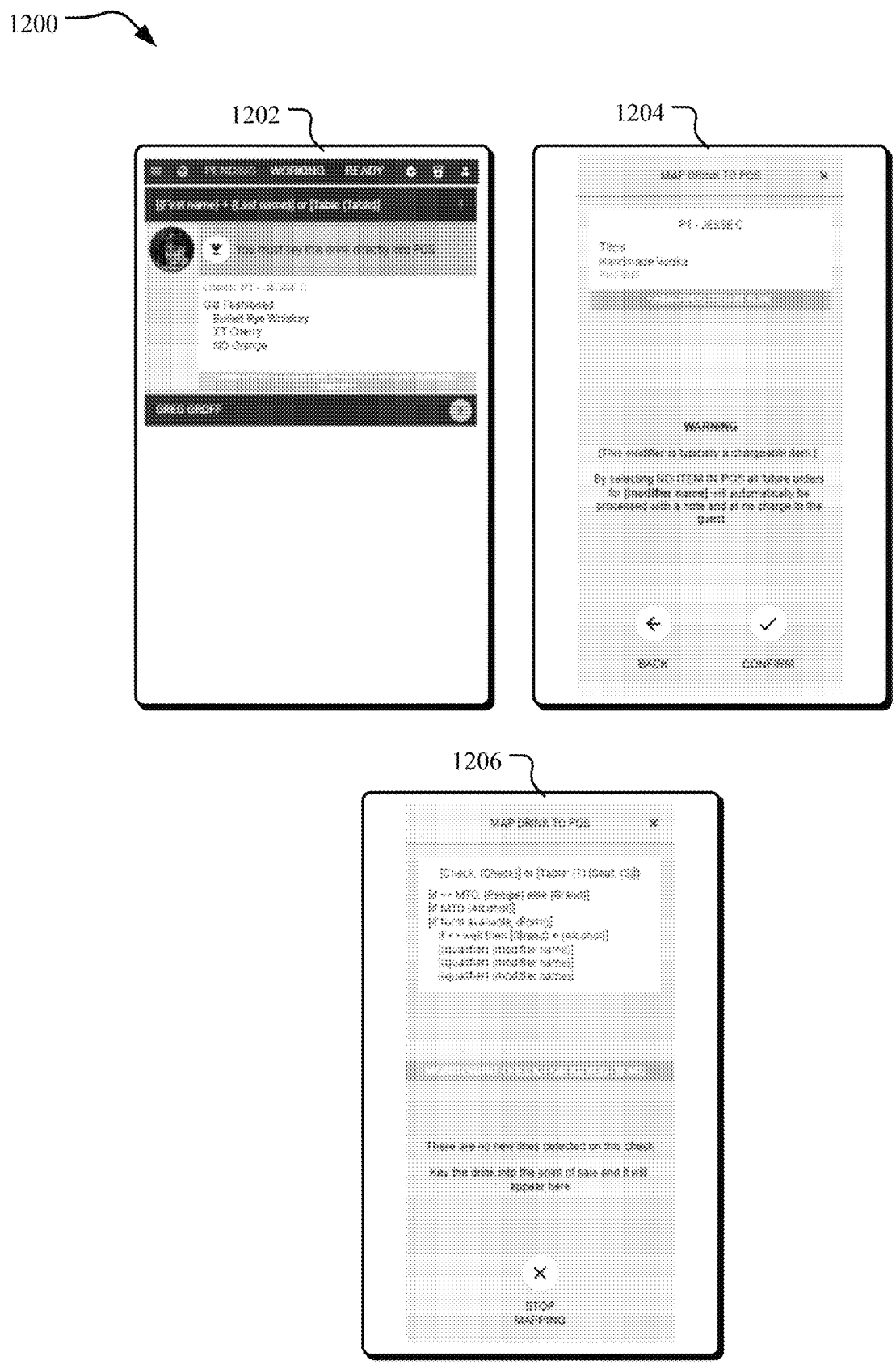
FIG. 12 illustrates example retailer operational services interfaces for mapping beverage orders to a point-of-sale (POS) system.

FIG. 12 depicts example retailer operational service interfaces 1200 provided by the beverage ordering manager service 102 to the retailer systems 210. For instance, the operational services 306 can determine that a beverage order is not mapped to the POS system 112 and generate a mapping message 1202 indicating the unmapped status. The beverage order can be in the pending category because of the unmapped status. In some examples, the operational services 306 generates a mapping list 1204 that can indicate which beverage item of the beverage order recipe lacks the POS system 112 mapping. The operational services 306 can determine whether the unmapped item is a chargeable item for the recipe and generate a corresponding indication. Moreover, upon receiving an input at the retailer device 108, the operational services 306 can save data indicating that future orders associated with a particular modifier are to be free of charge. In some instances, the operational services 306 can generate a mapping process indicator 1206 indicating that a check is being scanned for corresponding standardized product schema 118 mappings, and that the POS system 112 is awaiting an input.

Figure 13:
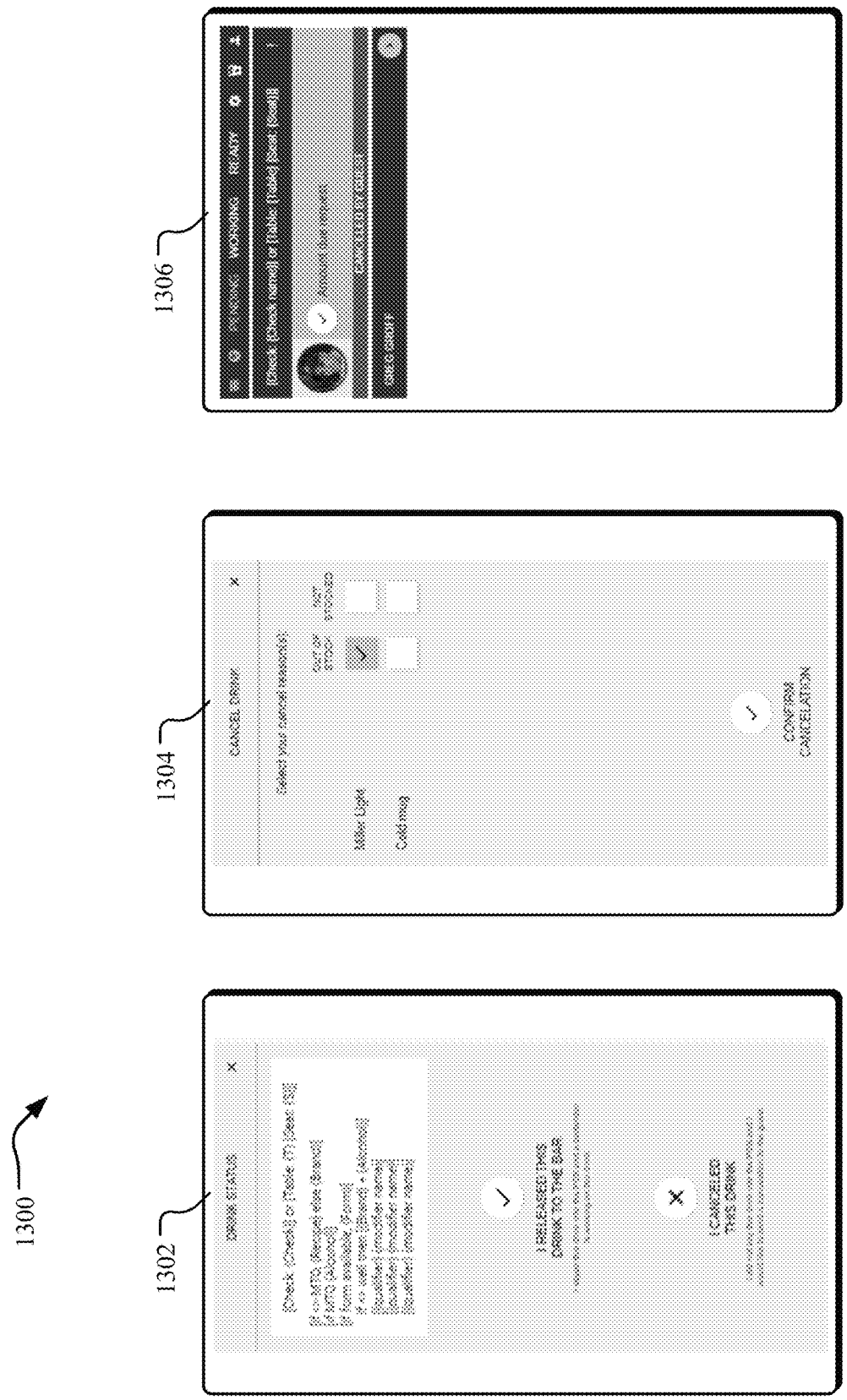
FIG. 13 illustrates example retailer operational services interfaces for dispatching beverage orders including cancelling a beverage order.

FIG. 13 depicts example retailer operational service interfaces 1300 provided by the beverage ordering manager service 102 to the retailer systems 210. For instance, the operational services 306 can determine and present a beverage order status 1302 at the retailer device 108 and receive an input indicating whether the beverage order is released to the bar for fulfillment (e.g., that the beverage order is to be changed from the pending category to the working category). The operational services 306 can also receive an input at the retailer device 108 indicating that the beverage order is canceled. Upon receiving the cancellation input, the operational services 306 can receive cancellation reason input 1304 indicating why the beverage order is canceled (e.g., out of stock, not stocked, user 106 unauthorized or unverified, etc.) and confirming the cancellation. An order cancellation indicator can be presented at the pending category list 1306. Additionally, the operational services 306 can generate a cancellation indicator associated with a paper check request.

Figure 14:
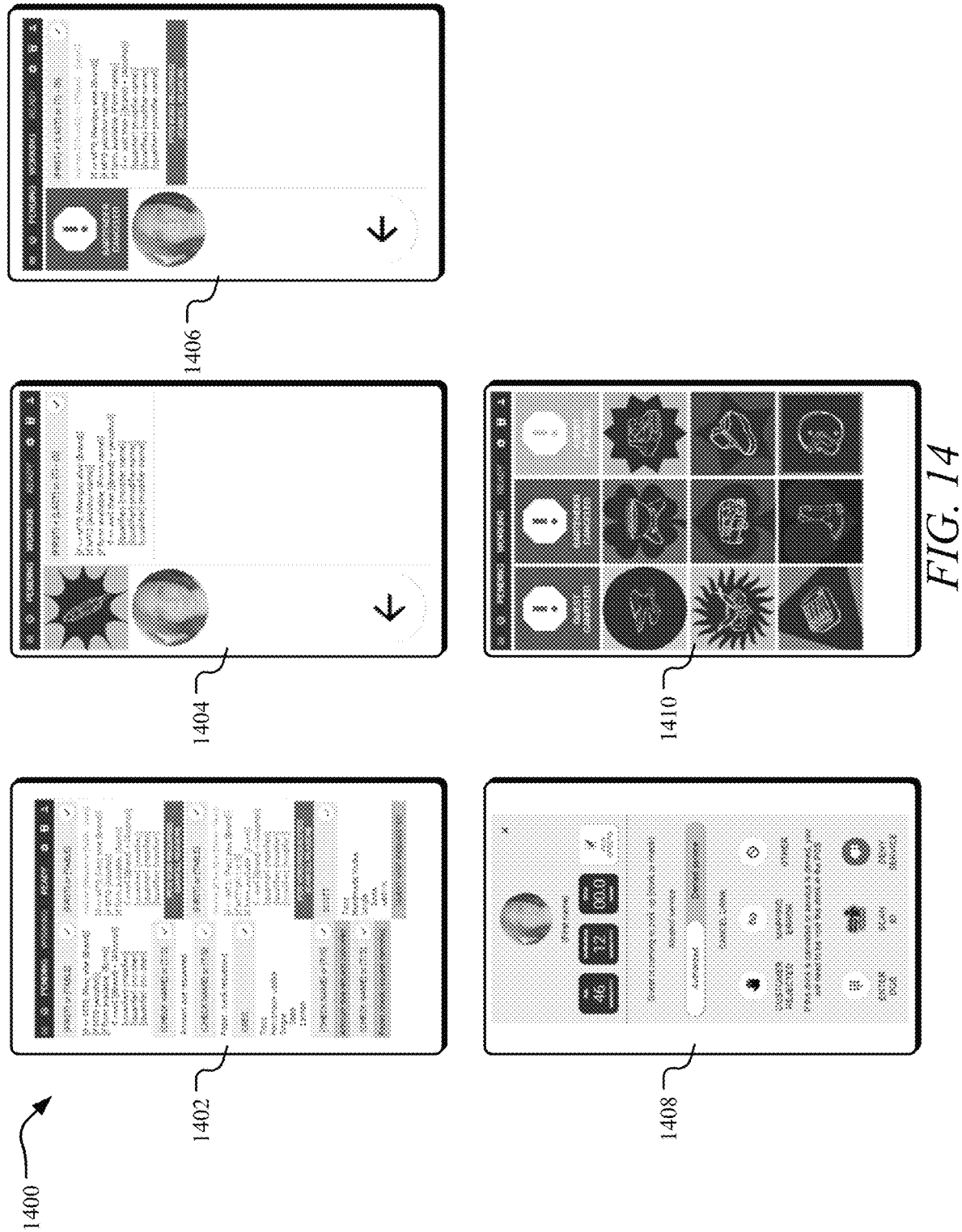
FIG. 14 illustrates example retailer operational services interfaces for dispatching beverage orders having a working status or a ready status.

FIG. 14 depicts example retailer operational service interfaces 1400 provided by the beverage ordering manager service 102 to the retailer systems 210. For instance, the operational services 306 can generate a working categories list 1402 by aggregating beverage orders having the working category association and collecting and presenting a first name, table name, and/or beverage item details associated with the working beverage orders. The working categories list 1402 can include indicators indicating that a POS system 112 void is requested, the beverage order is canceled, an amount due request is canceled, and/or a paper check request is canceled. The operational services 306 can determine the beverage orders associated with the ready category and present a ready category list 1404 with order images and/or user profile photographs associated with the ready orders. A ready order cancellation 1406 can be received at the user device 110 and presented at the retailer device 108 (e.g., with an indication that the POS system 112 void is required for the canceled beverage order). The cancellation can be generated by the user 106 or by retail personnel at the retailer device 108. Moreover, a paper check request can be canceled in response to the beverage order cancellation. The operational services 306 can further receive an input at the user device 110 indicating that the user 106 is coming to pick up the beverage order in the ready category and generate a visiting guest indicator 1408 at the retailer device 108. The visiting guest indicator 1408 can receive input indicating whether alcohol service is authorized or denied for the soon-to-be visiting guest, whether the drink order is canceled because the visiting guest is rejected, a mapping error is associated with the beverage order, or for other reasons. Moreover, the operational services 306 can generate a ready orders list 1410 using the order images associated with the ready beverage orders. The ready orders list 1410 can replace order images associated with canceled orders with cancellation indicators.

Figure 15:
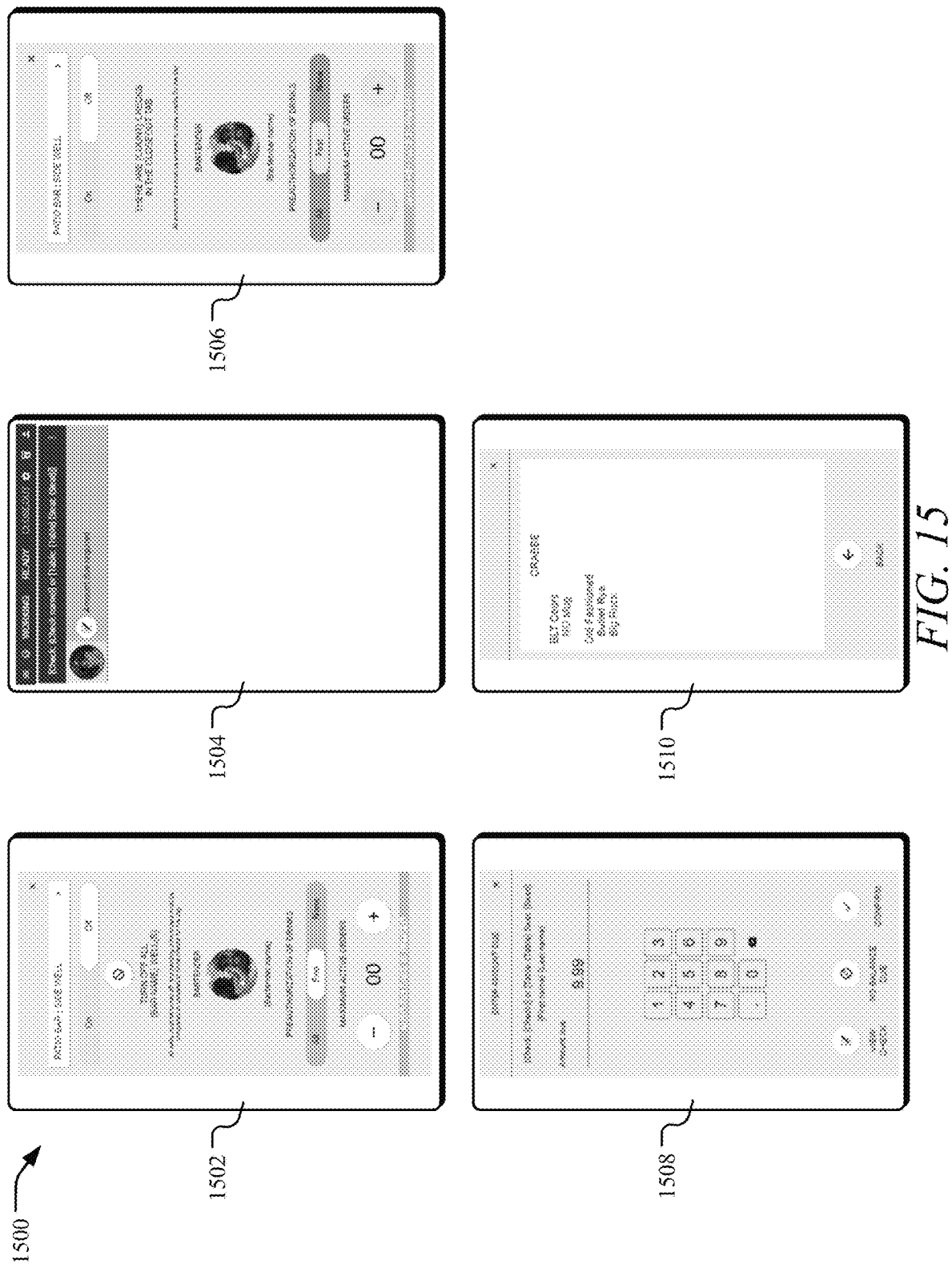
FIG. 15 illustrates example retailer operational services interfaces for dispatching beverage orders including closing out a check.

FIG. 15 depicts example retailer operational service interfaces 1500 provided by the beverage ordering manager service 102 to the retailer systems 210. The operational services 306 can generate and provide retailer establishment service data 1502 (e.g., based on input received at the retailer device 108) such as a bar identifier; whether the bar is active and serving beverages; a bartender name; a bartender photograph; an option to change bartenders; whether preauthorization of drinks (e.g., ID check) is required for all beverages order, a first order associated with the user profile, or no beverage orders (e.g., which can be toggled, for instance, in response to starting door security); a maximum number of active orders (e.g., beverage orders categorized as working orders), and/or whether auto-release of beverage orders from the pending category to the working category is paused. The operational services 306 can generate and provide closeout data 1504, such as a request for an amount due associated with a user profile. The operational services 306 can determine an amount of checks that have received a close out input at the user device(s) 110 and present the amount of checks at a close out interface 1506. The close out interface 1506 can also receive input to close all checks associated with the bar (e.g., which may be one of many bars at the retail establishment 104). In some instances, the operational services 306 generates a close out amount interface 1508 for receiving an amount due input and associating the amount due input with a check, table, seat, and/or user profile. The amount due input can be provided with a number pad. Moreover, the close out amount interface 1508 can receive input to cause a check to be displayed, to generate a zero for the amount due, and/or to confirm the entered amount due. Additionally, the operational services 306 can generate a close out check 1510 in response to receiving a view check input at the retailer device 108.

Figure 16:
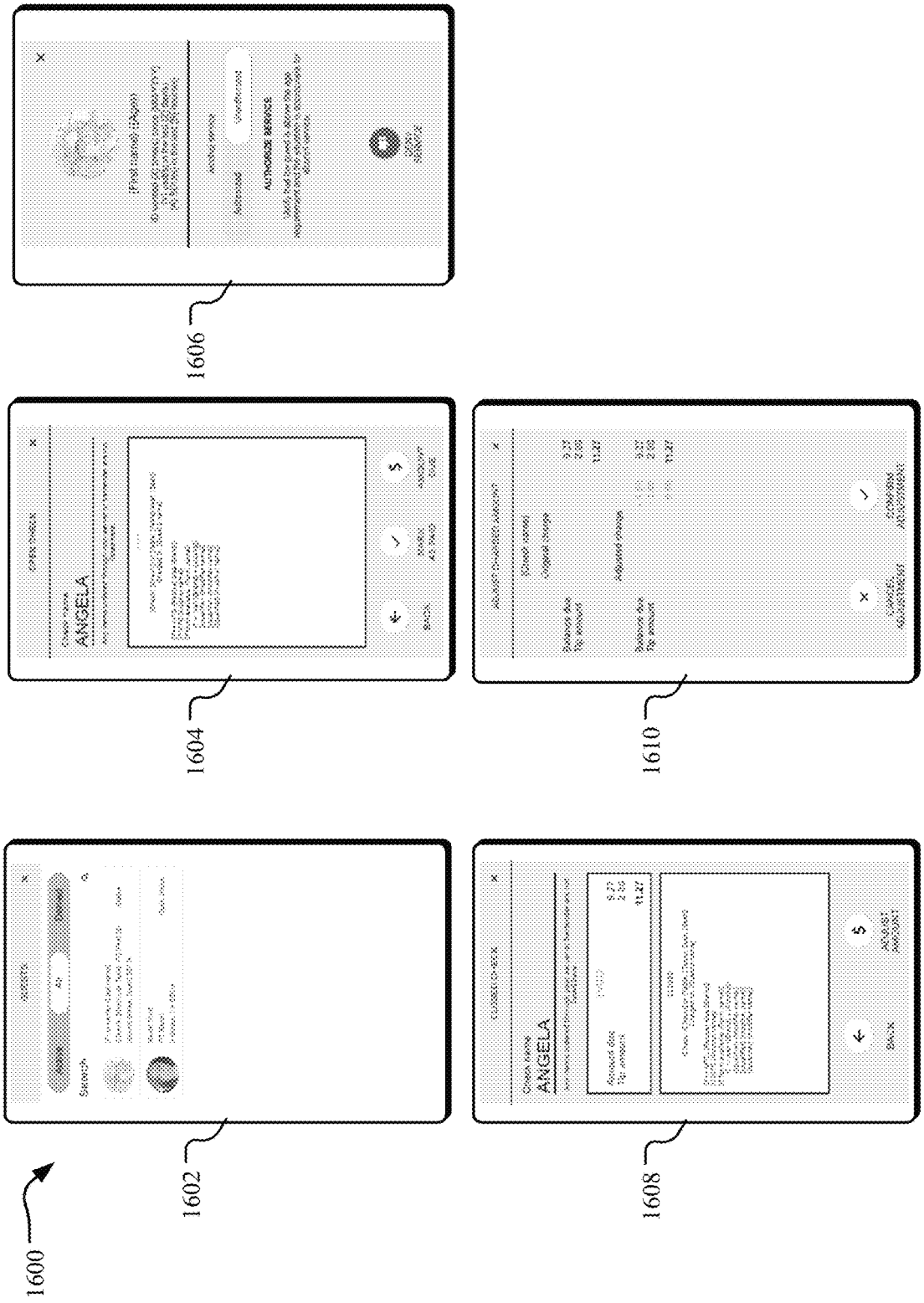
FIG. 16 illustrates example retailer operational services interfaces for dispatching beverage orders including accessing and adjusting a check.

FIG. 16 depicts example retailer operational service interfaces 1600 provided by the beverage ordering manager service 102 to the retailer systems 210. The operational services 306 can generate a list of guests 1602 that are determined to be at the retail establishment 104 (e.g., based on the predetermined distance 126) and/or have generated a beverage order. The list of guests 1602 can be categorize into active guests, all guests, and denied guests, and can present user profile indicators having a user profile name, a user profile photos, a number of ordered drinks, a number of SDUs ordered, and/or a check status (e.g., open, closed, etc.). Moreover, an open check interface 1604 may be generated (e.g., in response to a selection of a user profile indicator having the open check status). The open check interface 1604 can include an editable check name and a list of open beverage orders including beverage item details of the beverage orders. The operational services 306 can receive an input at the retailer device 108 indicating that the open check is marked as paid, to enter the amount due, to refund a charge, or to confirm a payment. The operational services 306 can generate and/or present a list of checks and associated user profiles having a closed check status. In some instances, the operational services 306 generates user profile interfaces 1606 including a first name, an age, a number of ID verifications since a particular date, a number of visits to the retail establishment in a particular number of days, and a number of SDUs ordered in a particular number of hours. The operational services 306 can generate a closed check interface 1608 presenting an amount paid for the check identified by the check name and a list of the beverage order items associated with the closed check. Moreover, the operational services 306 can receive an input at the retailer device 108 to adjust an amount of a closed check and, in response, generate an adjust charged amount interface 1610. The adjust charged amount interface 1610 can receive charge adjustments (e.g., and generate confirmations of the adjustments (e.g., refunds) once an adjustment confirmation is received.

Turning to FIGS. 17-23, operational services 306 provided to the guest user systems 212 are discussed with respect to different interfaces presented at the user device(s) 110.

Figure 17:
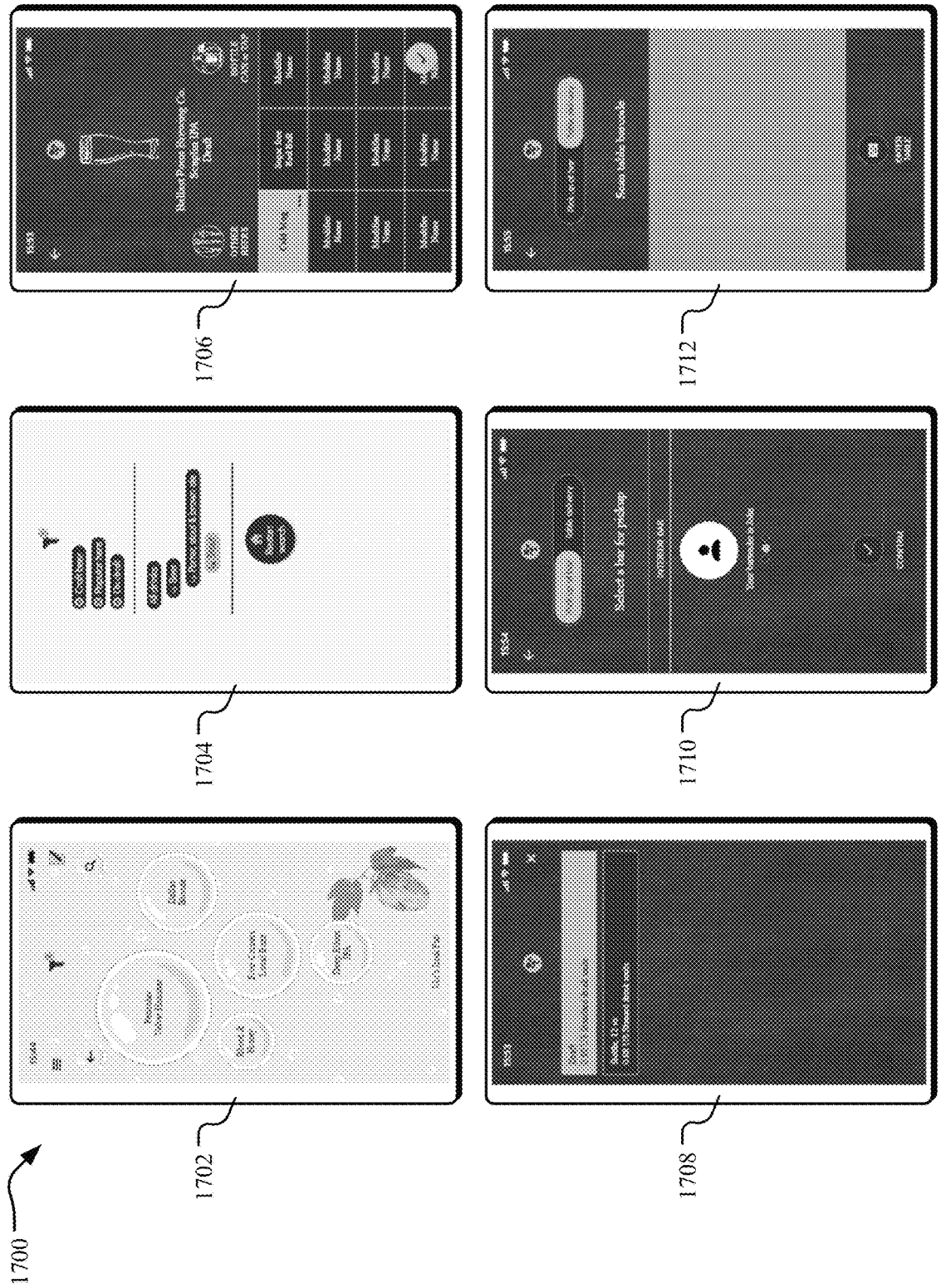
FIG. 17 illustrates example guest user services interfaces for dispatching beverage orders including generating beverage order.

FIG. 17 depicts guest user operational service interfaces 1700 for generating and receiving a beverage order for the user device 110. For instance, the operational services 306 can generate a beverage item selection interface 1702 with one or more beverage indicators representing beverage items and/or preferences generated by the preference services 314. A beverage search interface 1704 can be generated that lists beverage items in a hierarchical structure based on the standardized product schema 118 and/or the preferences. The guest user operational service interfaces 1700 can include a beverage ordering interface 1706 for selecting or browsing by a beverage category, a beverage sub-category (e.g., style, type, etc.), and/or modifiers. The beverage ordering interface 1706 can receive the selection of beverage items constituting the beverage order and a confirmation to generate the beverage order. In some instance, the operational services 306 can generate a beverage details request 1708. For instance, the beverage details request 1708 can request a user input at the user device 110 to select between different beverage options of the selected beverage order (e.g., that have not yet been clarified by the beverage order selection), such as draft or bottle, ice or no ice, small or large, and the like. The beverage ordering interface 1706 can also generate a request for an input at the user device 110 indicating whether the user profile already has an open check with the retail establishment. In some examples, the guest user operational service interfaces 1700 can include a beverage fulfillment selection interface 1710 for receiving an input indicating how the user 106 would like the beverage order fulfilled. For instance, the input can indicate whether the beverage order will be fulfilled via a table deliver or via the user picking up the beverage order from a beverage delivery area (e.g., the bar counter). The beverage fulfillment selection interface 1710 can also present a bar identifier (e.g., "interior bar"), a bartender name, a bartender photo image, a table or seat number associated with the beverage order (e.g., when table delivery is selected), and/or a selectable confirmation indicator. Additionally, the operational services 306 can instruct the user device 110 to scan a bar code or QR code at the table to provide input to a table delivery interface 1712, or the table number can be entered manually.

Figure 18:
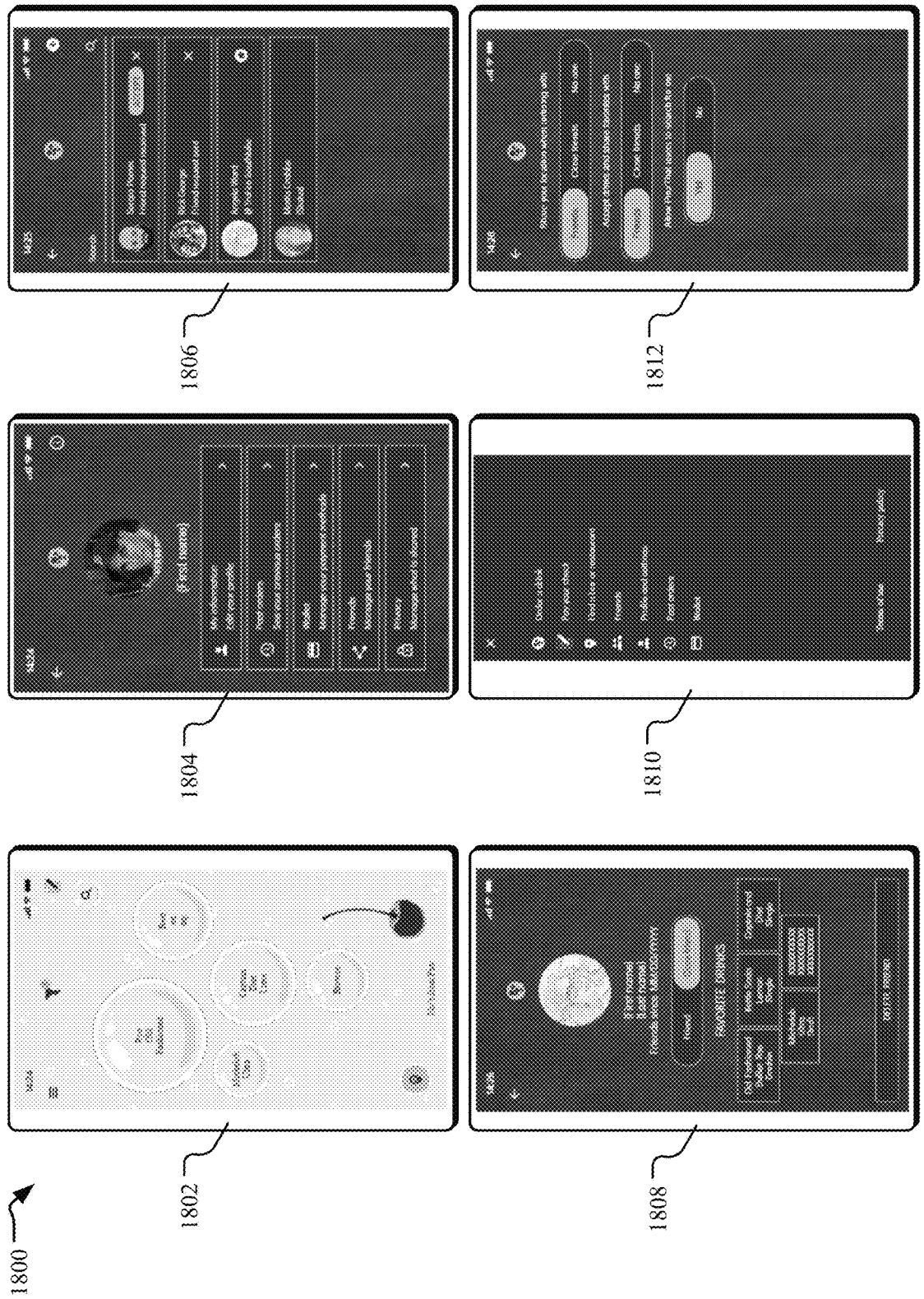
FIG. 18 illustrates example guest user services interfaces for dispatching beverage orders including managing friend associations.

FIG. 18 depicts guest user operational service interfaces 1800 for managing friend associations for the user device 110. The guest user operational service interfaces 1800 can include a beverage item selection interface 1802 with a friend management icon or selectable element for initiating the friend services 316. Additionally or alternatively, the friend services 316 can be initiated or accessed from a user profile interface 1804, corresponding to a first user profile, presented at the user device 110. The operational services 306 can generate the user profile interface 1804 with options to edit the user profile data 124, view an order history, manage payment methods, manage friend associations, and/or manage privacy settings. In response to receiving an input at the user profile interface 1804 (e.g., to select a friend management element), the operational services 306 and/or the friend services 316 can determine and present a friend list 1806 as a plurality of user profile identifiers (e.g., including user profile photos, names, and/or friend association statuses) corresponding to user profiles that have the friend association with the first user profile. The guest user operational service interfaces 1800 can include a friend profile interface 1808 presenting information of a second user profile having the friend association with the first user profile. For instance, the friend profile interface 1808 can present the user profile photo and name, a date indicating when the friend association was generated, an interactive element for receiving input indicating a friend sub-category (e.g., "friend," or "close friend"), one or more favorite drink indicators (e.g., based on preferences generate for the second user profile), and/or an interactive element to remove the friend association. The operational services 306 can generate a beverage ordering management interface 1810 for the user device 110, which can include one or more interactive elements for creating a beverage order, paying and closing out an open check, finding a retail establishment 104 using the beverage ordering system 202, initiating the friend services 316, editing user profile data 124 and user profile settings, viewing the order history, and/or viewing payment methods (e.g., a "wallet"). Moreover, the operational services 306 and/or the friend services 316 can provide a location settings interface 1812. The location settings interface 1812 can receive input at the user device 110 indicating which devices are permitted to receive location data from the user device 110 (e.g., user devices 110 with the "friends" association, "close friends" association, and/or no one). Additionally, the location settings interface 1812 can receive input indicating which devices are permitted to generate beverage orders for the first user profile using the friend services 316 (e.g., "friends," "close friends," or "no one"). Finally, the location settings interface 1812 can receive input at the user device 110 to control whether other user(s) 110 can search for the first user profile.

Figure 19:
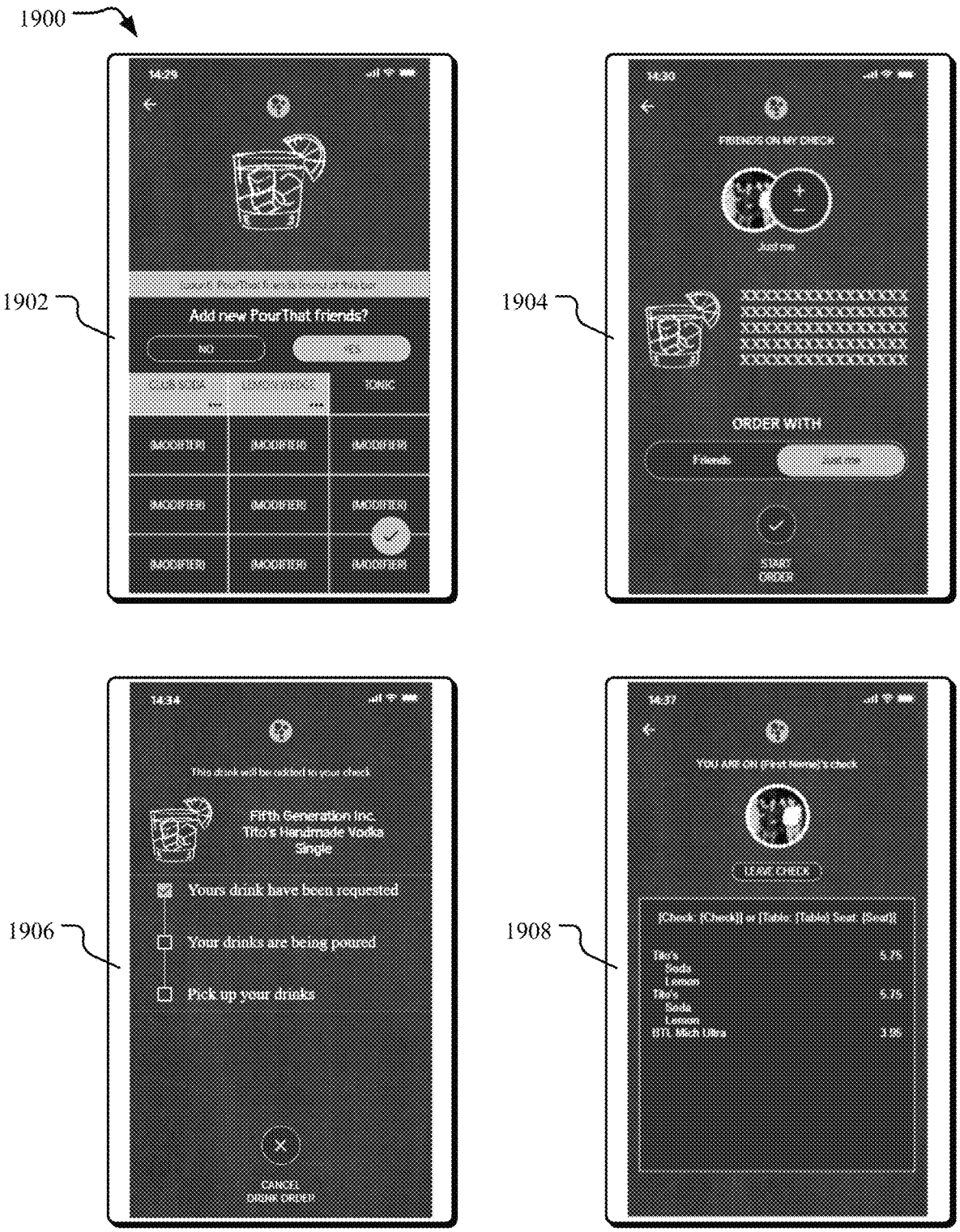
FIG. 19 illustrates example guest user services interfaces for dispatching beverage orders including generating a friend-based beverage order.

FIG. 19 depicts guest user operational service interfaces 1900 for managing beverage orders for the user device 110. The guest user operational service interfaces 1900 can generate an add friend prompt 1902, for instance, in response to receiving a request at the second user device 130 to create the friend association. The operational services 306 and/or friend services 316 can determine and present a number of user devices 110 at the retail establishment 104 with the friend association to the first user profile. The add friend prompt 1902 can be generated and presented over any other of the interfaces presented at the user device 110 discussed herein. The guest user operational service interfaces 1900 can include a friend ordering interface 1904 indicating which users 106 are on a check for the first user device, a beverage order, and to receive an input indicating whether the beverage order is being generated on the check associated with friends or as a separate standalone check. The interface 1904 can generate a bar code or QR code for scanning at the second user device 130 to confirm that the beverage order has been generated for the second user device 130 via the friend services 316. A beverage order progress interface 1906 can be generated and presented at the user device 110 with a progress bar or check box indicating the category of the beverage order (e.g., whether the beverage order is requested and/or pending, being poured and/or working, or ready for pick up or delivery). A check viewing interface 1908 can generate and present a check associated with the user profile and beverage orders based on friend associations. For instance, the interface 1908 can list the beverage orders that have been associated with the check and an indication of whether the check is associated with another user profile with the friend association. Moreover, the interface 1908 can provide an interactive element for receiving an input that causes the user profile to be removed from a friend-based check.

Figure 20:
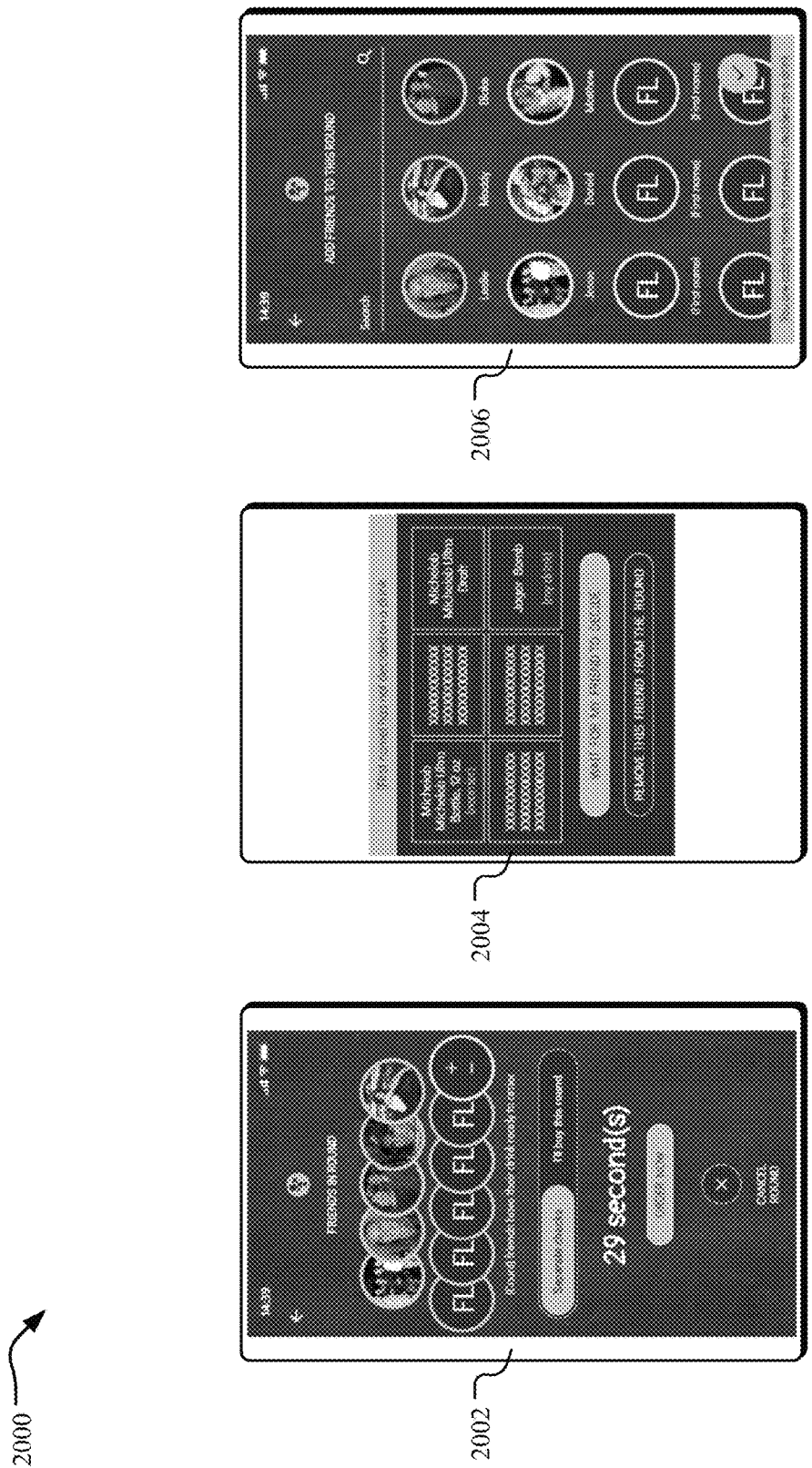
FIG. 20 illustrates example guest user services interfaces for dispatching beverage orders including generating a round of friend-based beverage orders.

FIG. 20 depicts guest user operational service interfaces 2000 for managing beverage orders for the user device 110. For instance, the operational services 306 and/or the friend services 316 can facilitate ordering a round of beverage orders (e.g., multiple beverage orders) on a single check associated with the first user device 122. A round ordering interface 2002 can be generated and presented at the user device 110, presenting indicators of the user profiles that have been associated with a round of beverage orders. Moreover, the round ordering interface 2002 can receive input indicating whether the round of beverage orders corresponds to multiple separate checks or if the round of beverages orders is aggregated into a single check for the first user profile. The operational services 306 and/or friend services 316 can generate and present a countdown timer (e.g., 30 seconds, 1 minute, 5 minutes, etc.) until the round of beverage orders is created and submitted to the retailer device 108. Moreover, the operational services 306 and/or the friend services 316 can receive, at the round ordering interface 2002 input to order or cancel the round of beverage orders before the countdown timer expires. Additionally, the guest user operational service interfaces 2000 can include a friend beverage selection interface 2004 for selecting a beverage order for a user profile that is included in the round of beverage orders. For instance, a user profile from the round ordering interface 2002 that has not yet entered a beverage order can be selected to initiate the friend beverage selection interface 2004. At the friend beverage selection interface 2004, multiple beverage item suggestions can be presented (e.g., including preferences associated with the selected user profile), as well as interactive elements for selecting a beverage order, waiting for the second user device 130 to select the beverage order, or to remove the user profile from the round of beverages. Additionally, a friend adding interface 2006 can be generated to present identifiers of friend user profiles that can be selected to add the friend user profiles to the round of beverages. The interface 2006 can include visual indicators representing whether the friend user profiles have selected a beverage item for the round of beverage orders or if the friend user profiles are yet to place an order for the round of beverage orders, such as color coded borders around user profile photos.

Figure 21:
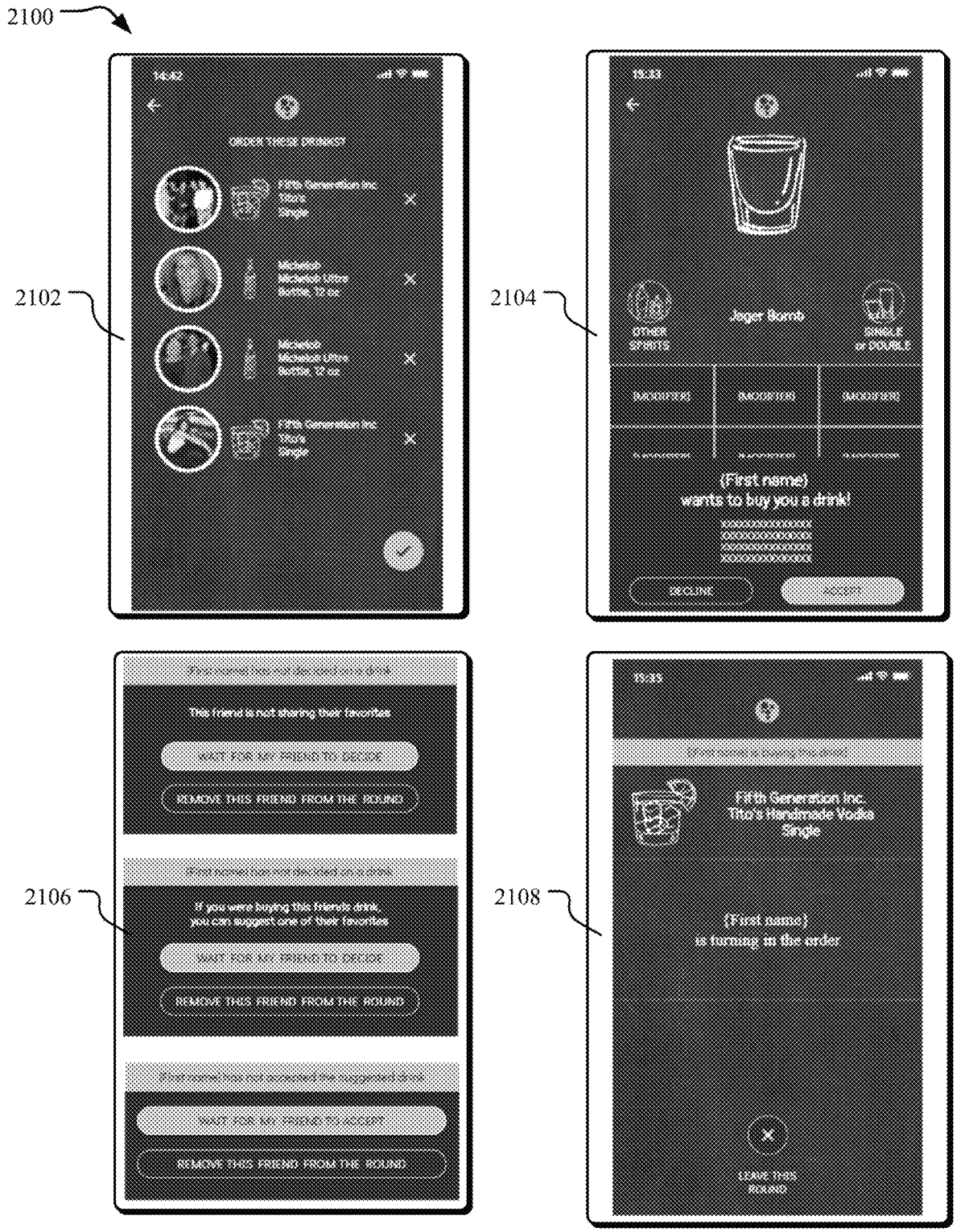
FIG. 21 illustrates example guest user services interfaces for dispatching beverage orders including generating a round of friend-based beverage orders.

FIG. 21 depicts guest user operational service interfaces 2100 for managing beverage orders for the user device 110. In some instances, the operational services 306 and/or the friend services 316 can generate a round beverage orders list 2102 with user profiles and beverage items corresponding to the beverage orders on the round of beverage orders. The round beverage orders list 2102 can receive user input confirming that the round beverage orders list 2102 is correct and/or whether to remove a beverage order from the round beverage orders list 2102. A friend beverage order request interface 2104 can be generated as a prompt at the second user device 130 to request input from the second user device 130 to accept or decline a beverage order purchase from the first user device 122 via the friends services 316. Similarly, the friend beverage order request interface 2104 can receive input accepting or declining a request to join a round of beverage orders. The guest user operational service interfaces 2100 can include one or more friend order prompts 2106, such as a prompt indicating that a friend has not shared their favorite beverages and requesting whether to wait for the friend to enter a beverage order or remove the beverage order from the friend. The one or more friend order prompts 2106 can indicate that the friend has not entered a beverage order and receive input to suggest a beverage order for the friend, or that the friend has not accepted the suggested beverage order. In some instances, a friend order confirmation interface 2108 can be presented at the second user device 130 (e.g., associated with the friend user profile) indicating the beverage order, which user profile is buying the beverage, and a status of the beverage order. Moreover, the friend order confirmation interface 2108 can receive a user input causing the second user device 130 to leave the round of beverage orders.

Figure 22:
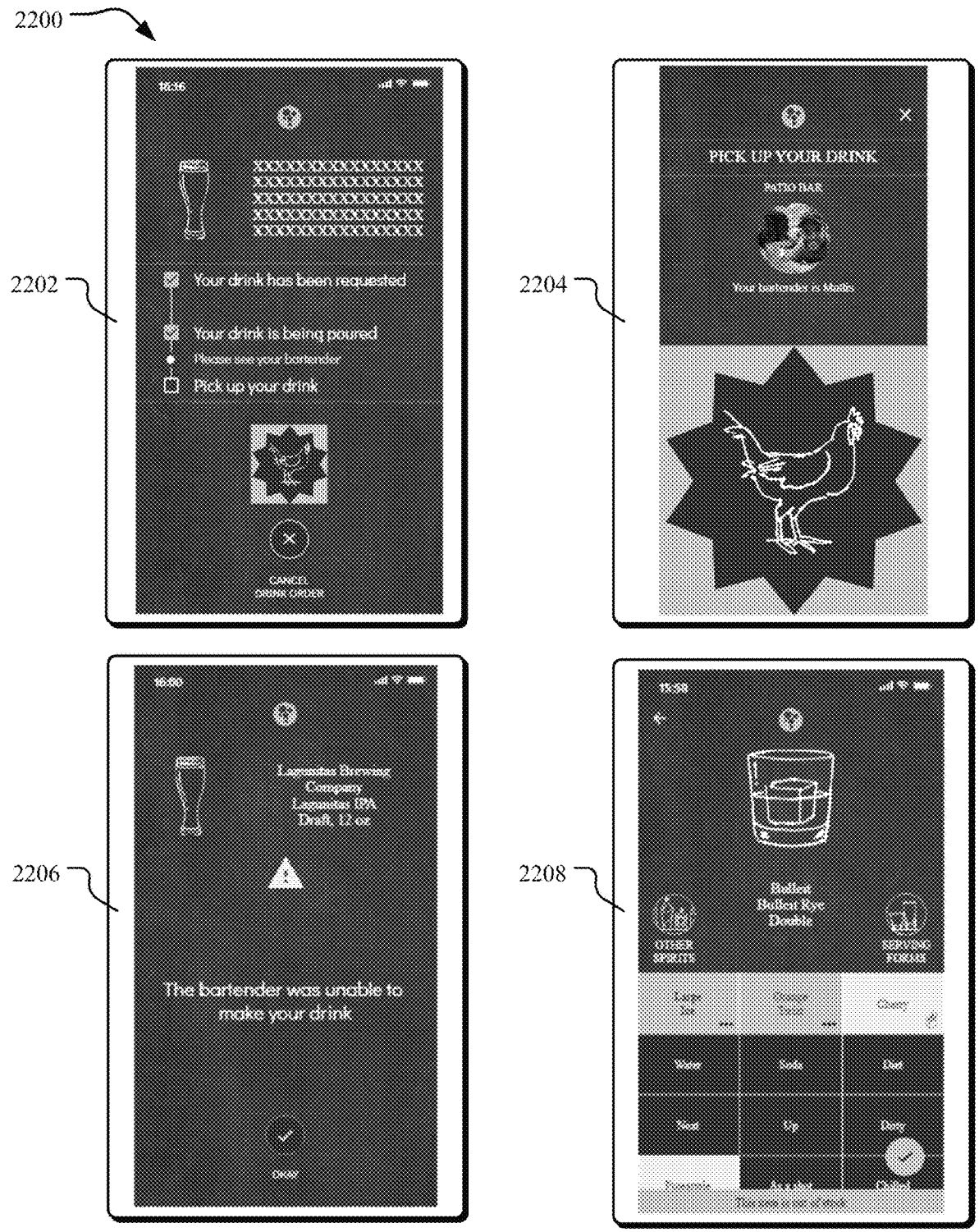
FIG. 22 illustrates example guest user services interfaces for dispatching beverage orders including a beverage order fulfillment process.

FIG. 22 depicts guest user operational service interfaces 2200 for managing beverage orders for the user device 110. For instance, upon receiving a beverage order, the operational services 306 can generate a beverage order status interface 2202 that presents the fulfillment stage of the beverage order, an indicator identifying the contents of the beverage order, the order image associated with the beverage order, and an option to cancel the beverage order. Moreover, upon receiving a user input requesting a visit at the retailer device 108, the operational services 306 can generate an indication of the visit request. In response to the beverage order being poured and/or being categorized in the ready category, the operational services 306 can generate and/or present a beverage order pick up interface 2204 at the user device 110. The beverage order pick up interface 2204 can include a bar identifier (e.g., "patio bar"), a bartender name, an indication that the beverage order is ready for pick up, and the order image associated with the ready beverage order. In some instances, the retailer device 108 can receive input indicating that a pending beverage order cannot be made (or the beverage ordering system 202 can determine that the beverage order is unfulfillable for other reasons) and, in response, generate an unfulfillable indicator 2206 at the user device 110. Moreover, during the beverage ordering process, the operational services 306 can determine that a particular beverage item is out of stock and, in response, generate an out-of-stock interface 2208 to alert the user. In some instances, the operational services 306 can determine whether a modification to the beverage order removes a standard ingredient of a recipe (e.g., based on the standardized product schema 118), and present a corresponding indicator.

Figure 23:
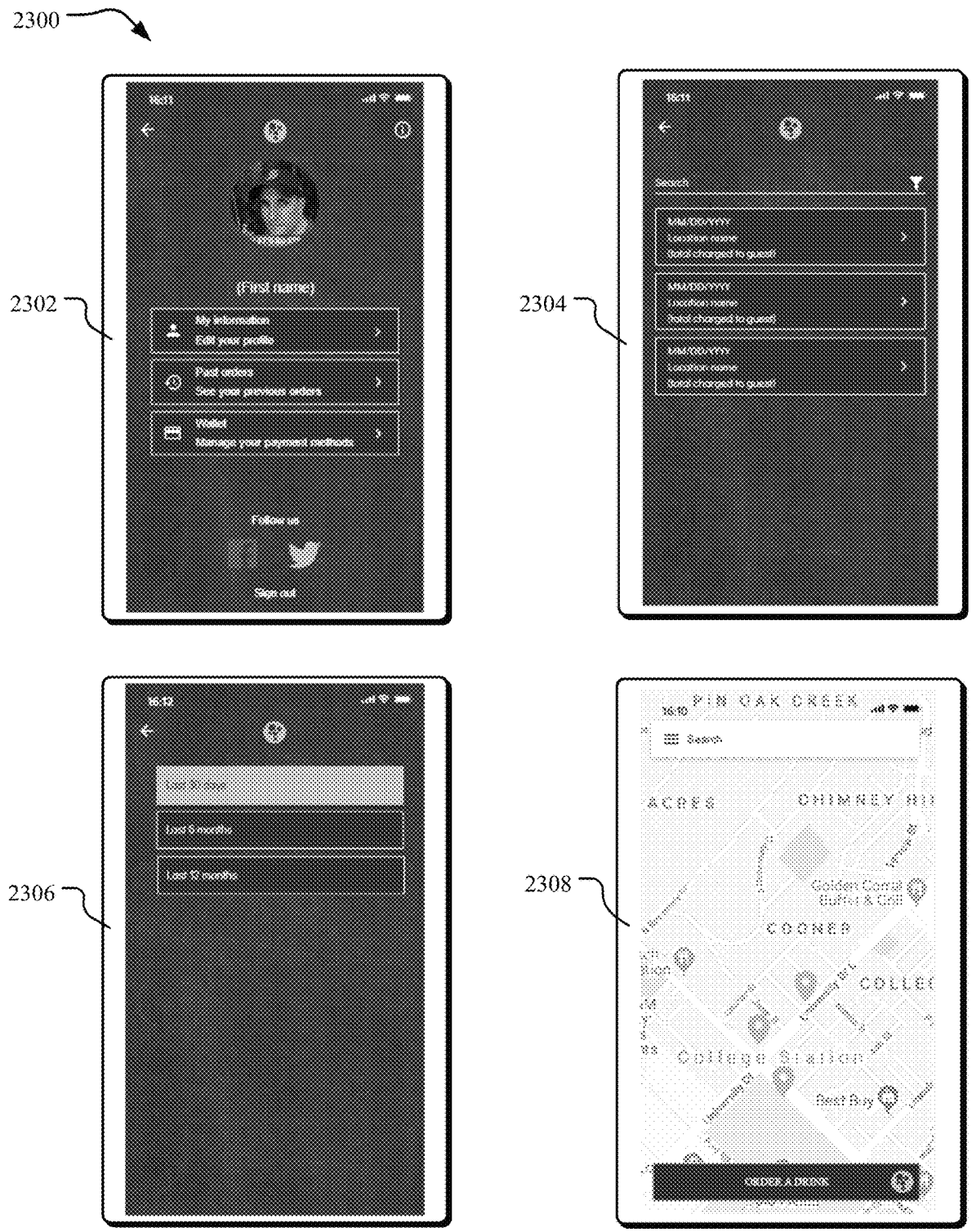
FIG. 23 illustrates example guest user services interfaces for dispatching beverage orders including an order history.

FIG. 23 depicts guest user operational service interfaces 2300 for managing beverage orders for the user device 110. The operational services 306 and/or the user profile services 312 can generate a user profile interface 2302 for receiving and editing the user profile data 124 associated with the user profile, viewing an order history for the user profile, and/or managing payment methods for the user profile. For instance, in response to receiving user input at the user profile interface 2302, the operational services 306 and/or the user profile services 312 can determine and generate a list of a plurality of previous beverage orders 2304 including a date, a retail establishment name, a total charge amount, an amount of SDUs, and/or other data associated with the previous beverage orders. The operational services 306 and/or the user profile services 312 can receive an input at a order history time frame interface 2306 indicating the previous time period for which the order history is to be aggregated (e.g., the last 30 days, the last six months, the last 12 months, etc.). Moreover, the operational services 306 can generate a beverage locator interface 2308 with a mapping system for determining and presenting locations of retail establishments that use the beverage ordering system 202.

Figure 24:
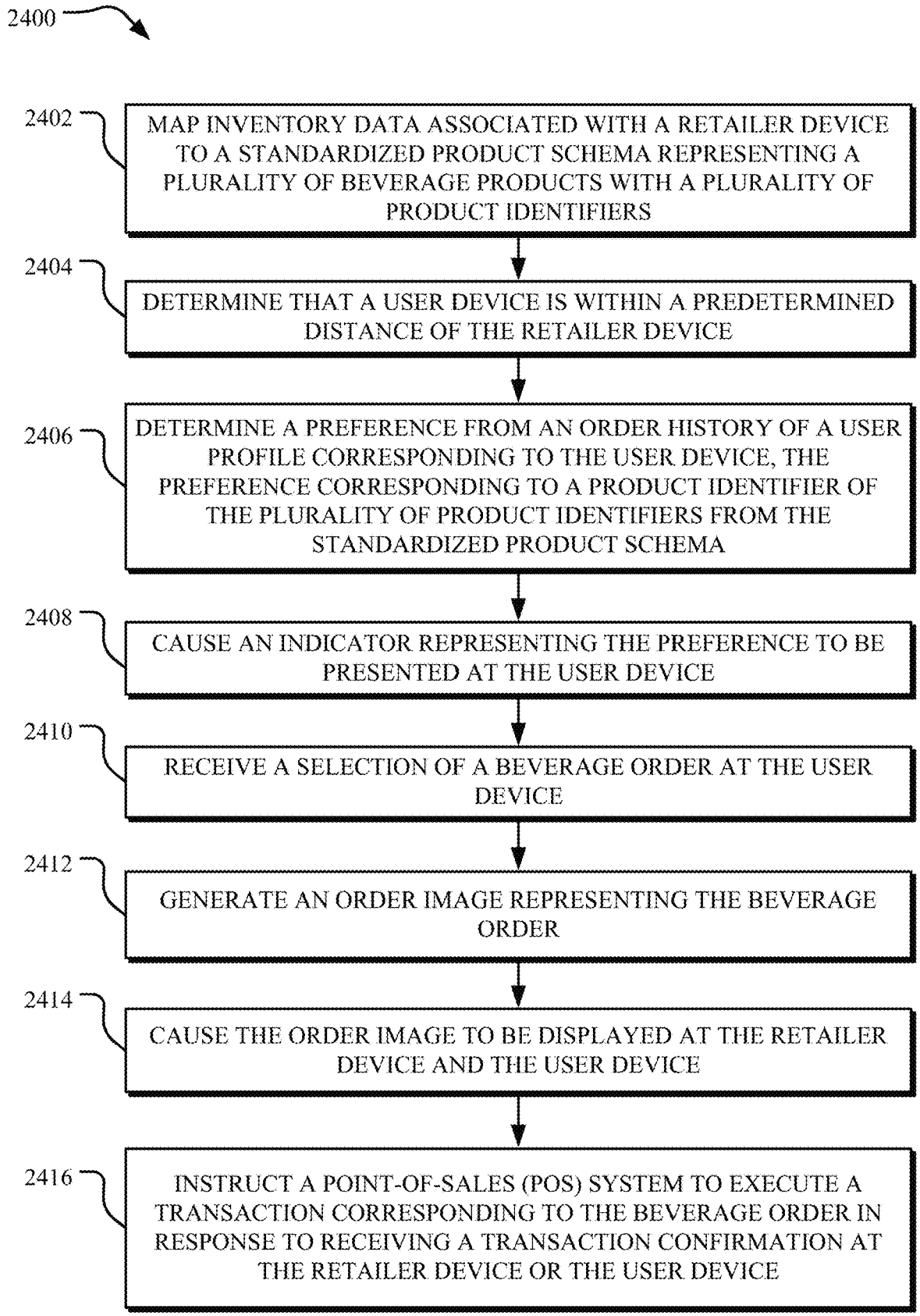
FIG. 24 illustrates an example method for dispatching beverage orders.

FIG. 24 illustrates an example method 2400 for providing a beverage ordering service, which can be performed by any of systems 100, 300, and 400 discussed herein. At operation 2402, the method 2400 maps inventory data associated with a retailer device to a standardized product schema representing a plurality of beverage products with a plurality of product identifiers. At operation 2404, the method 2400 determines that a user device is within a predetermined distance of the retailer device. At operation 2406, the method 2400 determines a preference from an order history of a user profile corresponding to the user device, the preference corresponding to a product identifier of the plurality of product identifiers from the standardized product schema. At operation 2408, the method 2400 causes an indicator representing the preference to be presented at the user device. At operation 2410, the method 2400 receives a selection of a beverage order (e.g., of the preference and/or another beverage item) at the user device. At operation 2412, the method 2400 generates an order image representing the beverage order. At operation 2414, the method 2400 causes the order image to be displayed at the retailer device and the user device. At operation 2416, the method 2400 instructs a POS system to execute a transaction corresponding to the beverage order in response to receiving a transaction confirmation at the retailer device or the user device.

It is to be understood that the specific order or hierarchy of operations in the method depicted in FIG. 24 are instances of example approaches and can be rearranged while remaining within the disclosed subject matter. For instance, any of the operations depicted in FIG. 24 may be omitted, repeated, performed in parallel, performed in a different order, and/or combined with any other of the operations depicted in FIG. 24. Any of the operations performed by the systems 100, 300, and 400 to provide beverage ordering services discussed throughout this disclosure can be included in the method 2400.

While the present disclosure has been described with reference to various implementations, it will be understood that these implementations are illustrative and that the scope of the present disclosure is not limited to them. Many variations, modifications, additions, and improvements are possible. More generally, implementations in accordance with the present disclosure have been described in the context of particular implementations. Functionality may be separated or combined differently in various implementations of the disclosure or described with different terminology. These and other variations, modifications, additions, and improvements may fall within the scope of the disclosure as defined in the claims that follow.

What is claimed is:

1. A method for beverage ordering dispatching, the method comprising:
    storing, at a first database, a standardized product schema representing a plurality of beverage products, the standardized product schema is based on converting data from a plurality of retailer computing devices into standardized product identifiers;
    receiving, at a user interface of a retailer computing device, an onboarding input indicating inventory data associated with the retailer computing device;
    receiving, from the first database and at the retailer computing device, a plurality of product identifiers from the standardized product schema;
    mapping, at the retailer computing device, the inventory data to the plurality of product identifiers;
    storing, at a second database associated with the retailer computing device, the inventory data mapped to the plurality of product identifiers;
    determining, at the retailer computing device, that a user device associated with a user profile is at a location associated with the retailer computing device;
    determining, at the retailer computing device, a preference associated with the user profile, the preference corresponding to a product identifier of the plurality of product identifiers from the standardized product schema;
    causing, based on the preference corresponding to the product identifier, an indicator associated with the preference to be presented at the user device;
    receiving, from the user device and at the retailer computing device, an order input indicating a selection of the preference;
    generating, at the retailer computing device, a randomized order image, wherein the randomized order image is used to identify a transaction corresponding to the selection, wherein generating the randomized order image includes performing a randomized image generation procedure that selects a color and an object image to form the randomized order image;
    causing the randomized order image to be displayed at the retailer computing device;
    causing the randomized order image to be displayed at the user device responsive to an input received at the retailer computing device; and
    receiving, at the retailer computing device, a transaction confirmation associated with the transaction.

2. The method of claim 1, wherein the order input is a first order input, the product identifier is a first product identifier, and the method further comprises:
    receiving a second order input corresponding to a second product identifier;
    determining that the second product identifier is absent from the plurality of product identifiers corresponding to the inventory data; and
    generating, in response to the second product identifier being absent from the plurality of product identifiers corresponding to the inventory data, a prompt at the retailer computing device to add the second product identifier to the plurality of product identifiers corresponding to the inventory data.

3. The method of claim 2, further comprising:
    causing a beverage ordering service application to be operational at the retailer computing device for receiving the randomized order image, wherein generating the prompt to add the second product identifier to the plurality of product identifiers corresponding to the inventory data occurs after the beverage ordering service application is operational at the retailer computing device.

4. The method of claim 1, further comprising:
    mapping the transaction associated with the transaction confirmation to a point-of-sale (POS) device associated with the retailer computing device.

5. The method of claim 1, wherein the order input is a first order input and the product identifier is a first product identifier, the method further comprising:
    receiving a second order input at a point-of-sale (POS) system associated with the retailer computing device;
    determining that the second order input corresponds to a second product identifier that is absent from the plurality of product identifiers corresponding to the inventory data; and
    adding the second product identifier to the plurality of product identifiers corresponding to the inventory data.

6. The method of claim 1, wherein the inventory data includes one or more indications of:
    an alcohol category,
    alcohol type,
    an alcohol brand,
    a custom beverage recipe,
    a standardized beverage recipe,
    a recipe modifier,
    a pour volume,
    a beverage packaging,
    a type of glassware,
    a house beverage indicator,
    a well beverage indicator,
    a rotator beverage indicator,
    a point-of-sale (POS) system category identifier, or
    a discount time period.

7. The method of claim 1, further comprising generating the inventory data by:
    performing image recognition or text recognition on an image file of a beverage product, the image file generated by the retailer computing device; or
    scanning a bar code of the beverage product.

8. The method of claim 1, further comprising:
    causing the randomized order image to be displayed at the retailer computing device with a first photo corresponding to the user profile; and causing the randomized order image to be displayed at the user device with a second photo corresponding to a retailer personnel.

9. The method of claim 1, wherein determining the preference includes performing a rationalized pareto analysis on an order history associated with the user profile.

10. The method of claim 9, wherein the rationalized pareto analysis generates simulated competitions between beverage recipe types, recipe modifiers, and sales tax designations indicating a beverage origin to determine the preference.

11. The method of claim 10, further comprising:
calculating a size dimension of the indicator based on a result of the rationalized pareto analysis.

12. The method of claim 1, wherein the user device is a first user device, the user profile is a first user profile, and the method further comprises:
determining that a second user device associated with a second user profile is at the location associated with the retailer computing device;
determining that the second user profile is associated with the first user profile via a friend status; and
receiving, from the first user device, a beverage order associated with the second user profile, wherein the randomized order image corresponds to the beverage order and the selection of the preference.

13. The method of claim 1, further comprising:
sending, to the user device, a request for an informal order commitment;
receiving a confirmation of the request; and
causing an establishment entry pass to be presented at the user device at least partly in response to the confirmation.

14. A method for beverage order dispatching, the method comprising:
storing, at a first database, a standardized product schema representing a plurality of beverage products, the standardized product schema is based on converting data from a plurality of retailer computing devices into standardized product identifiers;
receiving, at a user interface of a retailer computing device, an onboarding input associated with the retailer computing device indicating inventory data;
receiving, from the first database and at the retailer computing device, a plurality of product identifiers from the standardized product schema;
mapping, at the retailer computing device, the inventory data to the plurality of product identifiers;
storing, at a second database associated with the retailer computing device, the inventory data mapped to the plurality of product identifiers;
determining, at the retailer computing device, a preference associated with a user profile, the preference corresponding to a product identifier of the plurality of product identifiers from the standardized product schema;
causing, based on the preference corresponding to the product identifier, one or more indicators corresponding to one or more beverage items to be presented at a user device, the one or more beverage items being associated with a subset of the plurality of product identifiers from the standardized product schema;
receiving, from the user device and at the retailer computing device, an item selection input indicating a selected beverage item from the one or more beverage items;
generating, at the retailer computing device, an order image corresponding to the user device and the selected beverage item, wherein the order image is used to identify a transaction associated with the selected beverage item, wherein a randomized image generation procedure selects a color and an object image to form the order image;
causing the order image to be displayed at the retailer computing device;
receiving, at the retailer computing device, a transaction confirmation associated with the transaction represented by the order image;
mapping the transaction to a point-of-sales (POS) system associated with the retailer computing device;
receiving an order input corresponding to a product identifier;
determining that the product identifier is absent from the plurality of product identifiers corresponding to the inventory data; and
generating, in response to the product identifier being absent from the plurality of product identifiers corresponding to the inventory data, a prompt at the retailer computing device to add the product identifier to the plurality of product identifiers corresponding to the inventory data.

15. The method of claim 14, further comprising:
associating the transaction with an order preparation category, the order preparation category being a pending orders category, a working orders category, or a ready orders category.

16. The method of claim 15, further comprising:
determining a maximum working orders threshold value, wherein associating the transaction with the order preparation category is based on the maximum working orders threshold value.

17. The method of claim 15, further comprising:
determining an amount of visits or an amount of verifications associated with the user device, wherein associating the transaction with the order preparation category is based on the amount of visits or the amount of verifications associated with the user device.

18. The method of claim 14, further comprising:
determining a glassware volume associated with the transaction;
determining an alcohol percentage associated with the transaction;
calculating an amount of standard drink unit (SDU)s based on the glassware volume and the alcohol percentage; and
storing an indication of the amount of SDUs accessible by the user device or the retailer computing device.

19. A method for beverage order dispatching, the method comprising:
storing, at a first database, a standardized product schema representing a plurality of beverage products;
storing, at a second database associated with a retailer computing device, inventory data mapped to a plurality of product identifiers from the standardized product schema;
determining, at the retailer computing device, that a user device associated with a user profile is within a predetermined distance of the retailer computing device;
determining an amount of visits or an amount of verifications associated with the user profile;
performing a rationalized pareto analysis on an order history of the user profile to determine a beverage preference associated with the user profile;

causing an indicator associated with the beverage preference to be presented at the user device, a size dimension of the indicator being based on a result of the rationalized pareto analysis;

receiving, via a wireless network connection between the user device and the retailer computing device, an order input indicating a selection of the beverage preference;

confirming the order input based at least partly on the amount of visits or the amount of verifications associated with the user profile;

generating an order image corresponding to the selection;

causing the order image to be displayed at the retailer computing device;

causing the order image to be displayed at the user device; and associating a transaction corresponding to the selection with an order preparation category.

20. The method of claim 19, wherein the order image is a random order image used to identify the transaction corresponding to the selection, wherein generating the order image includes performing a randomized image generation procedure that selects a color and an object image to form the order image.

* * * * *